United States Patent [19]
Ido et al.

[11] Patent Number: 5,852,520
[45] Date of Patent: *Dec. 22, 1998

[54] DATA CONVERSION METHOD, PILOT SIGNAL FORMATION METHOD USING THE SAME ROTARY MAGNETIC HEAD DEVICE FOR USE THEREIN

[75] Inventors: Kihei Ido; Masayuki Ohta, both of Nagaokakyo, Japan

[73] Assignee: Mitsubishi Denki Kabushiki Kaisha, Tokyo, Japan

[ * ] Notice: The term of this patent shall not extend beyond the expiration date of Pat. No. 5,365,232.

[21] Appl. No.: 690,564

[22] Filed: Jul. 31, 1996

Related U.S. Application Data

[62] Division of Ser. No. 287,918, Aug. 9, 1994, Pat. No. 5,570,248, which is a division of Ser. No. 120,857, Aug. 31, 1993, Pat. No. 5,365,232, which is a continuation of Ser. No. 743,888, Aug. 12, 1991, abandoned.

[30] Foreign Application Priority Data

Aug. 18, 1990 [JP] Japan ................................ 2-217624
Feb. 26, 1991 [JP] Japan ................................ 3-30839
Jun. 14, 1991 [JP] Japan ................................ 3-143457

[51] Int. Cl.$^6$ ................................................ G11B 15/14
[52] U.S. Cl. ........................... 360/40; 360/41; 360/77.14; 341/58
[58] Field of Search ...................... 360/40, 41, 64, 360/47, 70, 77.14, 121; 341/58, 95, 106, 68; 386/124

[56] References Cited

U.S. PATENT DOCUMENTS

| | | | |
|---|---|---|---|
| 4,511,933 | 4/1985 | Hofelt et al. | 360/47 |
| 4,531,153 | 7/1985 | Watanabe | 386/124 |
| 4,626,826 | 12/1986 | Fukuda et al. | 341/58 |
| 4,731,678 | 3/1988 | Takeuchi | 360/40 |
| 5,010,424 | 4/1991 | Hasegawa et al. | 360/77.14 |
| 5,055,952 | 10/1991 | Noh | 360/77.14 |
| 5,136,436 | 8/1992 | Kahlman | 360/40 |
| 5,142,421 | 8/1992 | Kahlman et al. | 360/40 |
| 5,182,681 | 1/1993 | Yamazaki | 360/70 |
| 5,365,232 | 11/1994 | Ido et al. | 360/40 X |

FOREIGN PATENT DOCUMENTS

| | | |
|---|---|---|
| 0143553 | 6/1985 | European Pat. Off. . |
| 0468656 | 1/1992 | European Pat. Off. . |
| 58-47383 | 3/1983 | Japan . |
| 59-68862 | 4/1984 | Japan . |
| 1-317280 | 12/1989 | Japan . |

OTHER PUBLICATIONS

"One Study of Recording Codes for High Density Digital Magnetic Recording Target Home Use Digital VTR"—Publication Date Sep. 30, 1992.
Patent Abstracts of Japan, vol. 13, No.268, Jun. 20, 1989 & JP–A–01 057 825.
Patent Abstracts of Japan, vol. 10, No. 46, Feb. 22, 1986 & JP–A–60 201 728.
Patent Abstracts of Japan, vol. 8, No. 247, Nov. 13, 1984 & JP–A–59 123 343.
Patent Abstracts of Japan, vol. 10, No. 46, Feb. 22, 1986 & JP–A–60 201 729.

*Primary Examiner*—W. R. Young
*Assistant Examiner*—Patrick Wamsley
*Attorney, Agent, or Firm*—Birch, Stewart, Kolasch & Birch

[57] ABSTRACT

A data conversion method from m bits of data words into n bits of code words in recording or transmission, in which n is larger than m. A number of bit "0" arranged between one bit "1" and a next bit "1" is restricted to at most 4 in a code string of each code word, and a pair of groups of the n bits of code words corresponding to CDSs (code word digital sum) of two codes +1 and −1 are allowed to correspond to the m bits of data words. One of the two codes +1 and −1 is selectively used according to a DSV (digital sum variation) control signal to convert the m bits of data word into the n bits of code word. A pilot signal formation method using the data conversion method for obtaining a tracking error signal in a magnetic recording and reproducing apparatus, and a rotary magnetic head device for use in a magnetic recording and reproducing apparatus are also disclosed.

28 Claims, 35 Drawing Sheets

| DATA WORD (MSB-LSB) | | Q'=-1 CODE WORD (MSB-LSB) | DC | Q | Q'=1 CODE WORD (MSB-LSB) | DC | Q |
|---|---|---|---|---|---|---|---|
| 00 | 00000000 | 0101010101 | 0 | 1 | 0101010101 | 0 | -1 |
| 01 | 00000001 | 0101010111 | 0 | -1 | 0101010111 | 0 | 1 |
| 02 | 00000010 | 0101011101 | 0 | -1 | 0101011101 | 0 | 1 |
| 03 | 00000011 | 0101011111 | 0 | 1 | 0101011111 | 0 | -1 |
| 04 | 00000100 | 0101001001 | 0 | -1 | 0101001001 | 0 | 1 |
| 05 | 00000101 | 0101001011 | 0 | 1 | 0101001011 | 0 | -1 |
| 06 | 00000110 | 0101001110 | 0 | 1 | 0101001110 | 0 | -1 |
| 07 | 00000111 | 0101011010 | 0 | 1 | 0101011010 | 0 | -1 |
| 08 | 00001000 | 0101110101 | 0 | -1 | 0101110101 | 0 | 1 |
| 09 | 00001001 | 0101110111 | 0 | 1 | 0101110111 | 0 | -1 |
| 0A | 00001010 | 0101111101 | 0 | 1 | 0101111101 | 0 | -1 |
| 0B | 00001011 | 0101111111 | 0 | -1 | 0101111111 | 0 | 1 |
| 0C | 00001100 | 0101101001 | 0 | 1 | 0101101001 | 0 | -1 |
| 0D | 00001101 | 0101101011 | 0 | -1 | 0101101011 | 0 | 1 |
| 0E | 00001110 | 0101101110 | 0 | -1 | 0101101110 | 0 | 1 |
| 0F | 00001111 | 0101111010 | 0 | -1 | 0101111010 | 0 | 1 |
| ⋮ | ⋮ | ⋮ | ⋮ | ⋮ | ⋮ | ⋮ | ⋮ |
| F0 | 11110000 | 1101010101 | 0 | -1 | 1101010101 | 0 | 1 |
| F1 | 11110001 | 1101010111 | 0 | 1 | 1101010111 | 0 | -1 |
| F2 | 11110010 | 1101011101 | 0 | 1 | 1101011101 | 0 | -1 |
| F3 | 11110011 | 1101011111 | 0 | -1 | 1101011111 | 0 | 1 |
| F4 | 11110100 | 1101001001 | 0 | 1 | 1101001001 | 0 | -1 |
| F5 | 11110101 | 1101001011 | 0 | -1 | 1101001011 | 0 | 1 |
| F6 | 11110110 | 1101001110 | 0 | -1 | 1101001110 | 0 | 1 |
| F7 | 11110111 | 1101011010 | 0 | -1 | 1101011010 | 0 | 1 |
| F8 | 11111000 | 1111100101 | 2 | -1 | 0111100101 | -2 | -1 |
| F9 | 11111001 | 1111100111 | 2 | 1 | 0111100111 | -2 | 1 |
| FA | 11111010 | 1111101101 | 2 | 1 | 0111101101 | -2 | 1 |
| FB | 11111011 | 1111101111 | 2 | -1 | 0111101111 | -2 | -1 |
| FC | 11111100 | 1111111001 | 2 | 1 | 0111111001 | -2 | 1 |
| FD | 11111101 | 1111111011 | 2 | -1 | 0111111011 | -2 | -1 |
| FE | 11111110 | 1111111110 | 2 | -1 | 0111111110 | -2 | -1 |
| FF | 11111111 | 1111101010 | 2 | -1 | 0111101010 | -2 | -1 |

Fig. 2 PRIOR ART

$L_H \doteq (H/Vh) \times n$

| CDS | -1 | +1 | -3 | +3 | -5 | +5 |
|---|---|---|---|---|---|---|
| CODE WORD NUMBER | 2398 | 2218 | 1741 | 1360 | 811 | 505 |

Fig. 9

| MSB SIDE \ LSB SIDE 4BIT 8BIT | 0 | 1 | 2 | 3 | 4 | 5 | 6 | 7 | 8 | 9 | A | B | C | D | E | F |
|---|---|---|---|---|---|---|---|---|---|---|---|---|---|---|---|---|
| 00 | 28E2 | 5127 | 112B | 512D | 112E | D12F | 1135 | 9137 | 5139 | 113A | D13B | 913D | D13E | D13F | 514B | 514E |
| 01 | 1153 | 5155 | 1156 | D157 | 515A | 115C | D15D | 515F | 1165 | 9167 | 5169 | 116A | D16B | 916D | D16E | 116F |
| 02 | 5172 | 1174 | D175 | 5177 | 9179 | D17A | 117B | 517D | 117E | D17F | 5193 | 5196 | 519C | 11A3 | 51A5 | 11A6 |
| 03 | D1A7 | 51AA | 11AC | D1AD | 51AF | 51B4 | D189 | 51BB | 51BE | 11C5 | 91C7 | 51C9 | 11CA | D1CB | 91CD | D1CE |
| 04 | 11CF | 51D2 | 11D4 | D1D5 | 51D7 | 91D9 | D1DA | 110B | 51DD | 11DE | D1DF | 51E4 | D1E9 | 51EB | 51EE | 91F1 |
| 05 | D1F2 | 11F3 | 51F5 | 11F6 | D1F7 | 51FA | 11FC | D1FD | 51FF | 1227 | D1DF | 1220 | 922F | 923B | 923E | 5247 |
| 06 | 124B | 524D | 124E | 024F | 1255 | 9257 | 5259 | 125A | D25B | D25E | 1220 | D25E | 125F | 1269 | 926B | 926E | 5271 |
| 07 | 1272 | D273 | D275 | 0276 | 1277 | 927A | D27C | 127D | 927F | 9250 | 0528E | 1293 | 5295 | 1296 | D297 | 529A |
| 08 | 129C | D29D | 529F | 12A5 | 92A7 | 52A9 | 12AA | D2AB | 92AD | 52AE | 12AF | 52B2 | 12B4 | D2B5 | 52B7 | 92B9 |
| 09 | D2BA | 12BB | 529F | 128E | D2BF | 12C9 | 92CB | 92CE | 92AD | D2D2 | D2D3 | 92D5 | D2D6 | 12D7 | 92DA | D2DC |
| 0A | 12DD | 92DF | 52BD | 12E4 | D2E5 | 52E7 | 92E9 | D2EA | 52D1 | 12D2 | 12EE | D2EF | 92F2 | D2F4 | 12F5 | 92F7 |
| 0B | 52F9 | 12FA | D2FB | 92FD | D2FE | 12FF | 5313 | 5316 | 12EB | 52ED | 5325 | 1326 | D327 | 532A | 132C | D32D |
| 0C | 532F | 5334 | D339 | 533B | 533E | 1345 | 9347 | 5349 | 531C | 1323 | 934D | D34E | 134F | 5352 | 1354 | 1376 |
| 0D | 5357 | 9359 | D35A | 135B | D35D | 135E | D35F | 5364 | 134A | D34B | 536E | D36E | 1372 | 5352 | 5375 | D39C |
| 0E | D377 | 537A | 137C | D37D | 537F | 1389 | 9380 | 9380 | D369 | 9302 | 9393 | 9371 | D372 | 1373 | 939A | 93B7 |
| 0F | 139D | 939F | 53A2 | 13A4 | D3A5 | 53A7 | 93A9 | D3AA | 13AB | 53AD | 13AE | D3AF | 93B2 | D3B4 | 13B5 | D3D7 |
| 10 | 53B9 | 13BA | D3BB | 93BD | D3BE | 13BF | 53C4 | D3C9 | 53CB | 53CE | 93D1 | D3D2 | 13D3 | 53D5 | 13D6 | 13F4 |
| 11 | 53DA | 13DC | D3DD | 53DF | 93E2 | 13E4 | 13E5 | 93E7 | 53E9 | 13EA | D3EB | 93ED | D3EE | 13EF | 53F2 | 9473 |
| 12 | D3F5 | 53F7 | 93F9 | D3FA | 13FB | 53FD | 13FE | D3FF | 1447 | 144D | 144F | 1459 | 945B | 945E | 1471 | 94AB |
| 13 | 9476 | 947C | 1488 | 148D | 148E | D48F | 1495 | 9497 | 5499 | 149A | D49B | 949D | D49E | 149F | 14A9 | 14E2 |
| 14 | 94AE | 5481 | 14B2 | D4B3 | 14B5 | D4B6 | 14B7 | 94BA | D4BC | 14BD | D4BF | 14D1 | 94D3 | 94D6 | 94DC | D517 |
| 15 | D4E3 | 94E5 | D4E6 | 14E7 | 94EA | D4EC | 14ED | 94EF | D4F2 | 14F9 | 94FB | 94FE | 1513 | 5515 | 1516 | 5537 |
| 16 | 551A | 151C | D51D | 551F | 1525 | 9527 | 5529 | 152A | 052B | 952D | 052E | 152F | 5532 | 1534 | D535 | 955A |
| 17 | 9539 | D53A | 153B | 5530 | 153E | 053F | 1549 | 954B | 954E | 5551 | 1552 | 0553 | 5555 | D556 | 1557 | 1575 |
| 18 | D550 | 1550 | 555F | 5562 | 1564 | D565 | 5567 | 9569 | D56A | 156B | 556D | 156E | D56F | 9572 | D574 | 15A7 |
| 19 | 9577 | 5579 | 157A | 557B | 957D | 157E | 157F | 1591 | 9593 | 9596 | 959C | 15A2 | 05A3 | 95A5 | D5A6 | 15CE |
| 1A | 95AA | D5AC | 15AD | 95AF | 95B4 | 15B9 | 95BB | 95BE | 15C4 | D5C5 | 55C7 | 95C9 | D5CA | 15CB | 55CD | 55F1 |
| 1B | D5CF | 95D2 | D5D4 | 15D5 | 95D7 | 55D9 | 15DA | D5DB | 95DD | D5DE | 15DF | 95E4 | 15E9 | 95EB | 95EE | D62D |
| 1C | 15F2 | D5F3 | 95F5 | D5F6 | 15F7 | 95FA | D5FC | 15FD | 95EF | 1623 | 1625 | 1626 | D627 | 562A | 162C | D655 |
| 1D | 562F | 5634 | 5639 | 563B | 563E | 1645 | 9647 | 5649 | 164A | D64B | 964D | D64E | 164F | 5652 | 1654 | 1676 |
| 1E | 5657 | 9659 | D65A | 165B | 565D | 165E | D65F | 5664 | D669 | 566F | 566E | 9671 | D672 | 1673 | 5675 | D69C |
| 1F | D677 | 567A | 167C | D67D | 567F | 1689 | 968B | 968E | 5691 | 1692 | D693 | 9695 | D696 | 1697 | 969A | D69C |

Fig. 10 (a)(1)

| LSB SIDE 4BIT / MSB SIDE 8BIT | 0 | 1 | 2 | 3 | 4 | 5 | 6 | 7 | 8 | 9 | A | B | C | D | E | F |
|---|---|---|---|---|---|---|---|---|---|---|---|---|---|---|---|---|
| 20 | 169D | 969F | 56A2 | 16A4 | D6A5 | 56A7 | 96A9 | D6AA | 16AB | 56AD | 16AE | D6AF | 96B2 | D6B4 | 16B5 | 96B7 |
| 21 | 56B9 | 16BA | D6BB | 96BD | D6BE | 168F | 56C4 | D6C5 | 56CB | 56CE | 96D1 | D6D2 | 16D3 | 56D5 | 16D6 | D6D7 |
| 22 | 56DA | 16DC | D6DD | 56DF | 96E2 | D6E4 | 16E5 | 96E7 | 56E9 | 16EA | D6EB | 96ED | D6EE | 16EF | 56F2 | 16F4 |
| 23 | D6F5 | 56F7 | 96F9 | D6FA | 16FB | 56FD | 16EE | D6FF | 1711 | 9713 | 9716 | 971C | 1722 | 0723 | 9725 | D726 |
| 24 | 1727 | 972A | D72C | 172D | 972F | 9734 | 1739 | 973B | 973E | 1744 | 9745 | 5747 | 9749 | D74A | 174B | 574D |
| 25 | 174E | D74F | D752 | 0754 | 1755 | 9757 | 5759 | 175A | D75B | 975D | D75E | 175F | 9764 | 1769 | 976B | 976E |
| 26 | 5771 | 1772 | D773 | 9775 | 0776 | 1777 | 977A | D77C | 177D | 977F | 9789 | 578B | 578E | 9791 | D792 | 1793 |
| 27 | 5795 | 1796 | D797 | 579A | 179C | D79D | 579F | D7A2 | D7A4 | 17A5 | D789 | 57A9 | 17AA | D7AB | 97AD | D7AE |
| 28 | 17AF | 57B2 | 17B4 | D7B5 | 57B7 | 97B9 | D7BA | 17BB | 57BD | 17BE | D7BF | 97C4 | 17C9 | 97CB | 97CE | 57D1 |
| 29 | 17D2 | D7D3 | 97D5 | D7D6 | 17D7 | 97DA | D7DC | 17DD | 97DF | 57E2 | 17E4 | D7E5 | 57E7 | 97E9 | D7EA | 17EB |
| 2A | 57ED | 17EE | D7EF | 97F2 | D7F4 | 17F5 | 97F7 | 57F9 | 17FA | D7FB | 97FD | D7FE | 17FF | 1880 | 988F | 1899 |
| 2B | 989B | 989E | 18B1 | 98B3 | 98B6 | 98BC | 98E3 | 98E6 | 98EC | 9917 | 9917 | 5919 | 191A | D91B | 9910 | D91E |
| 2C | 191F | 1929 | 992B | 992E | 5931 | 1932 | D933 | D936 | 9937 | 993A | 993C | 993F | 1951 | 1953 |
| 2D | 9956 | 995C | 1962 | D963 | 9965 | D966 | 1967 | 9935 | D96C | 196D | 996F | 9974 | 1979 | 997B | 1951 | 9953 |
| 2E | 99A6 | 99AC | 99C5 | D9C6 | 19C7 | 99CA | D9CC | 996A | 99CF | 99D4 | 99D6 | 99DB | 99DE | 19F1 | 997E | 99A3 |
| 2F | 99FC | 5A1F | 1A25 | 9A27 | 5A29 | 1A2A | DA2B | 19CD | DA2E | 1A2F | 5A32 | 1A34 | DA35 | 5A37 | 9A39 | DA3A |
| 30 | 1A3B | 5A3D | 1A3E | DA3F | 1A49 | 9A4B | 9A4E | 5A51 | 1A52 | DA53 | 9A55 | DA56 | 1A57 | 9A5A | DA5C | 1A5D |
| 31 | 9A5F | 5A62 | 1A64 | DA65 | 5A67 | 9A69 | DA6A | 1A6B | 5A6D | 1A6E | DA6F | 9A72 | DA74 | 1A75 | 9A77 | 5A79 |
| 32 | 1A7A | DA7B | 9A7D | 1A7E | 1A7F | 1A91 | 9A93 | 9A96 | 9A9C | 1AA2 | DAA3 | 9AA5 | DAA6 | 1AA7 | 9AAA | DAAC |
| 33 | 1AAD | 9AAF | 9AB4 | 1AB9 | 9ABB | 9ABE | 1AC4 | DAC5 | 5AC7 | 9AC9 | DACA | 1ACB | 5ACD | 1ACE | DACF | 9AD2 |
| 34 | DAD4 | 1AD5 | 9AD7 | 5AD9 | 1ADA | DADB | 9ADD | DADE | 1ADF | 9AE4 | 1AE9 | 9AEB | 9AEE | 5AF1 | 1AF2 | DAF3 |
| 35 | 9AF5 | DAF6 | 1AF7 | 9AFA | DAFC | 1AFD | 9AFF | 9B23 | 9B26 | 9B2C | 1AE9 | 9AEB | 1B47 | 9B4A | DB4C | 1B4D |
| 36 | 9B4F | 9B54 | 1B59 | 9B5B | 9B5E | 1B71 | 9B73 | 9B76 | 9B7C | 5B87 | 9B45 | DB4C | 1B88 | 5B8D | 1B8E | DB8F |
| 37 | 9B92 | DB94 | 1B95 | 9B97 | 5B99 | 1B9A | DB9B | 9B9D | DB9E | 1B9F | 9B89 | DB8A | 9BAB | 9BAE | 5BB1 | 1BB2 |
| 38 | DBB3 | 9BB5 | 1B95 | 9BB7 | 9BBA | DBBC | DB9B | 9B8F | 1BD1 | 9BD3 | 9BA4 | 1BA9 | 9BAB | 1BE2 | DBE3 | 9BE5 |
| 39 | DBE6 | 1BE7 | DBEA | DBEC | 1BED | 9BEF | 9BF4 | 1BF9 | 9BF8 | 9BFE | 9BD6 | 9BDC | 5BE1 | 1C45 | 9C47 | 5C49 |
| 3A | 1C4A | DC4B | 9C4D | DC4E | 1C4F | 5C52 | 1C54 | DC55 | 5C57 | 9C59 | 5C2F | 5C3B | 5C3E | 1C45 | DC5F | 5C64 |
| 3B | DC69 | 5C6B | 5C6E | 9C71 | 1C73 | 5C75 | 9C9A | 1C76 | DC77 | 9C7A | DC5A | 1C6B | 5C5D | 5C5E | 9CBB | 9CBE |
| 3C | 5C91 | 1C92 | DC93 | 9C95 | DC96 | 1C97 | 9CB5 | DC9C | 1C9D | 9C9F | 1C7C | DC7D | 5C7F | 1C89 | 9CA9 | DCAA |
| 3D | 1CAB | 5CAD | 1CAE | DCAF | 0CB2 | DCB4 | 1CB5 | DCB7 | 5CB9 | 1CBA | 5CA2 | 1CA4 | DCA5 | 5CA7 | 5CC4 | DCC9 |
| 3E | 5CCB | 5CCE | 9CD1 | DCD2 | 1CD3 | 5CD5 | 1CD6 | DCD7 | 5CDA | 1CDC | DCDD | 9CDF | DCBE | 1CBF | 1CE5 | 9CE7 |
| 3F | 5CE9 | 1CEA | DCEB | 9CED | DCEE | 1CEF | 5CF2 | 1CF4 | DCF5 | 5CF7 | 9CF9 | DCFA | 1CFB | 5CFD | 1CFE | DCFF |

Fig. 10 (a)(2)

| MSB SIDE \ LSB SIDE 4BIT,8BIT | 0 | 1 | 2 | 3 | 4 | 5 | 6 | 7 | 8 | 9 | A | B | C | D | E | F |
|---|---|---|---|---|---|---|---|---|---|---|---|---|---|---|---|---|
| 40 | 1D11 | 9D13 | 9D16 | 9D1C | 1D22 | DD23 | 9D25 | DD26 | 1D27 | 9D2A | DD2C | 1D2D | 9D2F | 9D34 | 1D39 | 9D3B |
| 41 | 9D3E | 1D44 | DD45 | 5D47 | 9D49 | DD4A | 1D4B | 5D4D | 1D4E | DD4F | 9D52 | DD54 | 1D55 | 9D57 | 5D59 | 1D5A |
| 42 | DD5B | 9D5D | DD5E | 1D5F | 9D64 | 1D69 | 9D6B | 9D6E | 5D71 | 1D72 | DD73 | 9D75 | DD76 | 1D77 | 9D7A | DD7C |
| 43 | 1D7D | 9D7F | DD89 | 5D8B | 5D8E | 9D91 | DD92 | 1D93 | 5D95 | 1D96 | DD97 | 5D9A | 1D9C | DD9D | 5D9F | 9DA2 |
| 44 | DDA4 | 1DA5 | 9DA7 | 5DA9 | 1DAA | DDAB | 9DAD | DDAE | 1DAF | 5DB2 | 1DB4 | DDB5 | 5DB7 | DDB9 | DDBA | 1DBB |
| 45 | 5DBD | 1DBE | DDBF | 9DC4 | 1DC9 | 9DCB | 9DCE | 5DD1 | 1DD2 | DDD3 | 9DD5 | DDD6 | 1DD7 | 9DDA | DDDC | 1DDD |
| 46 | 9DDF | 5DE2 | 1DE4 | DDE5 | 5DE7 | 9DE9 | DDEA | 1DEB | 5DED | 1DEE | DDEF | 9DF2 | DDF4 | 1DF5 | 9DF7 | 5DF9 |
| 47 | 1DFA | DDFB | 9DFD | DDFE | 1DEF | 9E23 | 9E26 | 9E2C | 9E45 | 1EE6 | 1E47 | 9E4A | DE4C | 1E4D | 9E4F | 9E54 |
| 48 | 1E59 | 9E5B | 9E5E | 1E71 | 9E73 | 9E76 | 9E7C | 9E87 | 9EB9 | DEBA | 1EBB | 5E8D | DE8F | DE8F | 9E92 | DE94 |
| 49 | 1E95 | 9E97 | 5E99 | 1E9A | DE9B | 9E9D | 9E9E | 1E9F | 9EA4 | 1EA9 | 9EAB | 9EAE | 1EB1 | 1EB2 | DEB3 | 9EB5 |
| 4A | DEB6 | 1EB7 | 9EBA | DEBC | 1EBD | 9EBF | 9ED1 | 9ED3 | 9ED6 | 9EDC | 5EE1 | 1EE2 | DEE3 | 9EE5 | DEE6 | 1EE7 |
| 4B | DEEA | DEEC | 1EED | DEEF | 9EF4 | 1EE9 | 9EFB | 9EFE | 5FDB | 5FDE | 9F11 | 1F12 | 1F13 | 5F15 | 1F16 | 1F17 |
| 4C | 5F1A | 1F1C | DF1D | 5F1F | 9F22 | DF24 | 1F25 | 9F27 | 5F29 | 1F2A | DF2B | 9F2D | DF2F | 1F2F | 5F32 | 1F34 |
| 4D | DF35 | 5F37 | 9F39 | DF3A | 1F3B | DF3D | 1F3E | DF3F | 9F44 | 1F49 | 9F4B | 9F4E | 5F51 | 1F52 | DF53 | 9F55 |
| 4E | DF56 | 1F57 | 9F5A | DF5C | 1F5D | 9F5F | 5F62 | 1F64 | DF65 | 5F67 | 9F69 | DF6A | 1F6B | 5F6D | 1F6E | DF6F |
| 4F | 9F72 | DF74 | 1F75 | 9F77 | 5F79 | 1F7A | DF7B | 9F7D | DF7E | 1F7F | 1F91 | 9F93 | 9F96 | 9F9C | 5FA1 | 1FA2 |
| 50 | DFA3 | 9FA5 | DFA6 | 1FA7 | 9FAA | DFAC | 1FAD | 9FAF | 9FB4 | 1FB9 | 9FB8 | 9FBE | 5FC2 | 1FC4 | DFC5 | 5FC7 |
| 51 | 9FC9 | DFCA | 1FCB | 5FCD | 1FCE | DFCF | 9FD2 | DFD4 | 1FD5 | 9FD7 | 5FD9 | 1FDA | DFDB | 9FDD | DFDE | 1FDF |
| 52 | 9FE4 | 1FE9 | 9FEB | 9FEE | 5FF1 | 1FF2 | DFF3 | 9FF5 | DFF6 | 1FF7 | 9FFA | DFFC | 1FFD | 9FFF | 613F | 616F |
| 53 | 617B | 617E | 61CF | 61DB | 61DE | 61F3 | 61F6 | 61FC | 6227 | 222B | 622D | 222E | E22F | 2235 | A237 | 6239 |
| 54 | 223A | E23B | A23D | E23E | 223F | 624B | 624E | 2253 | 624E | 2256 | E257 | 625A | 225C | E25D | 625F | 2265 |
| 55 | A267 | 6269 | 226A | E26B | A26D | E26E | 226F | 6272 | 6255 | 6275 | 6277 | A279 | F27A | 227B | 627D | 227E |
| 56 | E27F | 6293 | 6296 | 629C | 22A3 | 22A5 | 22A6 | E2A7 | 62AA | 22AC | E2AD | 62AF | 62B4 | E2B9 | 62BB | 62BE |
| 57 | 22C5 | A2C7 | 62C9 | 22CA | 22CB | 22CD | 22CE | 22CF | 62D2 | 22D4 | E2D5 | 62D7 | A2D9 | E2DA | 22DB | 62DD |
| 58 | 22DE | E2DF | 62E4 | E2E9 | E2EB | 62EE | E2E1 | E2F2 | 62F3 | 62F5 | 22F6 | E2F7 | 62FA | 22FC | E2FD | 62FF |
| 59 | 6323 | 6326 | 632C | 6345 | 2346 | E347 | 634A | 234C | 634D | 6354 | 6357 | E359 | 635B | 635E | E371 | 6373 |
| 5A | 5376 | 637C | 6389 | 238A | A38D | A38E | E38E | 238F | 6392 | 2394 | E395 | 6397 | A399 | E39A | 239B | 639D |
| 5B | 239E | E39F | 63A4 | E3A9 | 63AB | A3AE | A3B1 | 63B2 | 6392 | 63B5 | 23B6 | E3B7 | 63BA | 23BC | 23BD | 63BF |
| 5C | E3D1 | 63D3 | 63A4 | 63DC | E3E2 | 23E3 | 63E5 | 23E6 | 23E7 | 63EA | 23EC | E3ED | 63EF | 63F4 | E3F9 | 63FB |
| 5D | 63FE | 6447 | 244B | 644D | 244E | E44F | 2455 | A457 | 6459 | 245A | 245B | A45D | E45E | 245F | 2469 | A46B |
| 5E | A46E | 6471 | 2472 | E473 | A475 | E476 | 2477 | A47A | E47C | 247D | A47F | 648B | 648E | 2493 | 6495 | 2496 |
| 5F | E497 | 649A | 249C | E49D | 649F | 24A5 | A4A7 | 64A9 | 24AA | E4AB | A4AD | E4AE | 24AF | 64B2 | 24B4 | E4B5 |

| LSB SIDE → 4BIT, 8BIT<br>MSB SIDE ↓ | 0 | 1 | 2 | 3 | 4 | 5 | 6 | 7 | 8 | 9 | A | B | C | D | E | F |
|---|---|---|---|---|---|---|---|---|---|---|---|---|---|---|---|---|
| 80 | EA5F | 6A64 | EA69 | 6A6B | 6A6E | AA71 | EA72 | 2A73 | 6A75 | 2A76 | EA77 | 6A7A | 2A7C | EA7D | 6A7F | 2A89 |
| 81 | AA8B | AA8E | 6A91 | 2A92 | EA93 | AA95 | EA96 | 2A97 | AA9A | EA9C | 2A9D | AA9F | 6AA2 | 2AA4 | EAA5 | 6AA7 |
| 82 | AAA9 | EAAA | 2AAB | 6AAD | 2AAE | EAAF | AAB2 | EAB4 | 2AB5 | AAB7 | 6AB9 | 2ABA | EABB | AABD | EABE | 2ABF |
| 83 | 6AC4 | EAC9 | 6ACB | 6ACE | AAD1 | EAD2 | 2AD3 | 6AD5 | 2AD6 | 6ADA | 6ADA | 2ADC | EADD | 6ADF | AAE2 | EAE4 |
| 84 | 2AE5 | AAE7 | 6AE9 | 2AEA | EAEB | AAED | EAEE | 2AEF | 6AF2 | EAF5 | 6ADA | 6AF7 | AAF9 | EAFA | 2AFB | 6AFD |
| 85 | 2AFE | EAFF | 2B11 | 2AEA | AB16 | AB1C | 2B22 | EB23 | AB25 | EB26 | 2B27 | AB2A | EB2C | 2B2D | AB2F | AB34 |
| 86 | 2B39 | AB3B | AB3E | AB5D | EB45 | 6B47 | AB49 | EB4A | 2B4B | 6B4D | 2B4E | EB4F | AB52 | EB54 | 2B55 | AB57 |
| 87 | 6B59 | 2B5A | EB5B | AB5D | EB5E | 285F | AB64 | 2B69 | AB6B | AB6E | 2B71 | EB72 | EB73 | AB75 | EB76 | 2B77 |
| 88 | AB7A | EB7C | 2B7D | AB7F | EB89 | 6BBB | 6BBE | AB91 | EB92 | 2B93 | 6BAF | 2B96 | EB97 | 6B9A | 289C | EB9D |
| 89 | 6B9F | ABA2 | EBA4 | 2BA5 | ABA7 | 6BBA | 2BAA | EBAB | ABAD | EBAE | 2BAF | 6BB2 | 2BB4 | EBB5 | 6BB7 | ABB9 |
| 8A | EBBA | 2BBB | 6BBD | 2BBE | EBBF | ABC4 | 2BC9 | ABCB | ABCE | 68D1 | 2BD2 | 6BB3 | ABD5 | EBD6 | 2BD7 | ABDA |
| 8B | EBDC | 2BDD | ABDF | 6BE2 | EBBF | EBE5 | 2BE7 | ABE9 | EBEA | 28EB | 2BED | EBEE | EBEF | ABF2 | EBF4 | 2BF5 |
| 8C | ABF7 | 6BF9 | 2BFA | FBFB | 2BE4 | EBFE | 2BFF | 6C45 | 2C46 | EC47 | 6C4A | 2C4C | EC4D | 6C4F | 6C54 | EC59 |
| 8D | 6C5B | EC5E | EC71 | 6C73 | 6C76 | 6C7C | 6C89 | 2C8A | ECBB | AC80 | EC8E | 2C8F | EC92 | 2C94 | EC95 | 6C97 |
| 8E | AC99 | EC9A | 2C9B | 2C9D | 2C9E | EC9F | 6CA4 | ECA9 | 6CAB | 6CAE | ACB1 | ECB2 | 6CB3 | 6CB5 | 2CB6 | EC87 |
| 8F | 6CBA | 2CBC | ECBD | 6C8F | ECD1 | ECD3 | 6CD6 | 6CDC | ECE2 | 2CE3 | 6CE5 | 2CE6 | 2CE7 | 6CEA | 2CEC | ECED |
| 90 | 6CEF | 6CF4 | ECF9 | 6CFB | 6CFE | 6D11 | 2D12 | ED13 | AD15 | ED16 | 2D17 | AD1A | ED1C | 2D1D | AD1F | 6D22 |
| 91 | 2D24 | ED25 | 6D27 | AD29 | ED22A | 2D2B | 6D2D | 2D2E | ED2F | AD32 | ED34 | 2D35 | AD37 | 6D39 | 2D3A | ED3B |
| 92 | AD3D | ED3E | 2D3F | 6D44 | ED49 | 6D4B | 6D4E | AD51 | ED52 | 2D53 | 6D55 | 2D56 | ED57 | 6D5A | 2D5C | ED5D |
| 93 | 6D5F | AD62 | ED64 | 2D65 | AD67 | 6D69 | 2D6A | ED6B | AD6D | ED6E | 2D6F | 6D72 | 2D74 | ED75 | 6D77 | AD79 |
| 94 | ED7A | 2D7B | 6D7D | 2D7E | ED7F | ED91 | 6D93 | 6D96 | 6D9C | EDA2 | 2DA3 | 6DA5 | 6DA6 | EDA7 | 6DAA | 2DAC |
| 95 | EDAD | 6DAF | 6DB4 | EDB9 | 6DBB | 6DBE | EDC4 | 2DC5 | ADC7 | 6DC9 | 2DCA | ECCB | ADCD | EDCE | 2DCF | 6DD2 |
| 96 | 2DD4 | EDD5 | 6DD7 | ADD9 | EDDA | 2DDB | 6DDD | 2DDE | EDDF | 6DE4 | EDE9 | 6DEB | ADEE | ADF1 | EDF2 | 2DF3 |
| 97 | 6DF5 | 2DF6 | 2DF7 | 6DFA | 2DFC | EDFD | 6DEF | 2E22 | EE23 | AE25 | EE26 | 2E27 | AE2A | EE2C | 2E2D | AE2F |
| 98 | AF34 | 2E39 | AF38 | AE3E | 2E44 | EE45 | 6E47 | AE49 | EE4A | 2E4B | 6E4D | 2E4E | AE4F | AE52 | EE54 | 2E55 |
| 99 | AF57 | 6E59 | 2E5A | EE5B | AE5D | EE5E | 2E5F | AE64 | EE69 | AE6B | AE6E | 6E71 | 2E72 | AE73 | AE75 | EE76 |
| 9A | 2E77 | AE7A | EE7C | 2E7D | AE7F | EE89 | 6EBB | 6EBE | AE91 | EE92 | 2E93 | 6E95 | 2E96 | EE97 | 6E9A | 2E9C |
| 9B | EE9D | 6E9F | AEA2 | EEA4 | 2EA5 | AEA7 | 6EA9 | 2EAA | AEAD | EEAE | AE6E | EEAF | 6EB2 | 2EB4 | EEB5 | 6EB7 |
| 9C | AEB9 | EEBA | 2EBB | 6EBD | 2EBE | EEBF | AEC4 | 2EC9 | AECB | AECE | AED1 | 2ED2 | EED3 | AED5 | EED6 | 2ED7 |
| 9D | AEDA | EEDC | 2EDD | 6EBD | EEE2 | 2EE4 | EEE5 | 6EE7 | AEE9 | EEEA | 2EEB | 6EED | 2EEE | EEEF | AEF2 | EEF4 |
| 9E | 2EF5 | AEE7 | 6EF9 | AEDF | EFFB | AEFD | EEFE | 2EFF | EF11 | 6F13 | 6F16 | 6F1C | EF22 | 2F23 | 6F25 | 2F26 |
| 9F | EF27 | 6F2A | 2F2C | EF2D | 6F2F | 6F34 | EF39 | 6F3B | 6F3E | EF44 | 2F45 | AF47 | 6F49 | 2F4A | EF48 | AF4D |

Fig. 10 (c)(1)

| LSB SIDE 4BIT / 8BIT MSB SIDE | 0 | 1 | 2 | 3 | 4 | 5 | 6 | 7 | 8 | 9 | A | B | C | D | E | F |
|---|---|---|---|---|---|---|---|---|---|---|---|---|---|---|---|---|
| A0 | EF4E | 2F4F | 6F52 | 2F54 | EF55 | 6F57 | AF59 | EF5A | 2F5B | 6F5D | 2F5E | EF5F | 6F64 | EF69 | 6F6B | 6F6E |
| A1 | AF71 | EF72 | 2F73 | 6F75 | 2F76 | EF77 | 6F7A | 2F7C | EF7D | 6F7F | 2F89 | AF88 | AF8E | 6F91 | 2F92 | EF93 |
| A2 | AF95 | EF96 | 2F97 | AF9A | EF9C | 2F9D | AF9F | 6FA2 | 2FA4 | EFA5 | 6FA7 | AFA9 | EFAA | 2FAB | 6FAD | 2FAE |
| A3 | EFAF | AFB2 | EFB4 | 2FB5 | AFB7 | 6F89 | 2FBA | EFBB | AFBD | EFBE | 2FBF | 6FC4 | EFC9 | 6FCB | 6FCE | AFD1 |
| A4 | EFD2 | 2FD3 | 6FD5 | 2FD6 | EFD7 | 6FDA | 2FDC | EFDD | 6FDF | AFE2 | 2FBF | 2FE5 | AFE7 | 6FE9 | 2FEA | EFEB |
| A5 | AFED | EFEE | 2FEF | 6FF2 | 2FF4 | EFF5 | 6FF7 | AFF9 | EFFA | 2FFB | 6FFD | 2FFE | EFFF | 3115 | B117 | 7119 |
| A6 | 311A | F11B | B11D | F11E | 311F | 3129 | B12B | B12E | 7131 | 3132 | F133 | B135 | F136 | 3137 | B13A | F13C |
| A7 | 3A3D | B13F | 3151 | B153 | 3156 | B15C | 3162 | F163 | B165 | F166 | 3167 | B16A | F16C | 3160 | B16F | B174 |
| A8 | 3179 | B17B | B17E | B1A3 | B1A6 | B1AC | B1C5 | F1C6 | 31C7 | B1CA | F1CC | 31CD | B1CF | B1D4 | 31D9 | B1DB |
| A9 | B1DE | 31F1 | B1F3 | B1F6 | B1FC | 721F | 3225 | B227 | 7229 | 322A | F22B | B220 | F22E | 322F | 7232 | 3234 |
| AA | F235 | 7237 | B239 | F23A | 323B | 723D | 3225 | F23F | 3249 | B24B | B24E | B220 | 3252 | F253 | B256 | F256 |
| AB | 3257 | B25A | F25C | 325D | B25F | 7262 | 3264 | F265 | 7267 | B269 | F26A | 7251 | 7260 | 326E | F26F | B272 |
| AC | F274 | 3275 | B277 | 7279 | 327A | 327B | B27D | F27E | 327F | 3291 | B293 | 3296 | B29C | 32A2 | F2A3 | B2A5 |
| AD | F2A6 | 3275 | B2AA | F2AC | 32AD | B2AF | B2B4 | 32B9 | 82BB | B2BE | 32C4 | B2C5 | 72C7 | B2C9 | F2CA | 32CB |
| AE | 72CD | 32CE | B2CF | B2D2 | F2D4 | 32D5 | B2D7 | 72D9 | 32DA | F2DB | B2DD | F2DE | 32DF | B2E4 | 32E9 | B2EB |
| AF | B2EE | 72F1 | F2CF | F2F3 | F2F5 | F2F6 | 32F7 | B2FA | F2FC | 32FD | B2FF | 8323 | 8326 | B32C | B345 | F346 |
| B0 | 3347 | B34A | F34C | 334D | B34F | B354 | 3359 | 835B | 835E | 3371 | B373 | 8376 | 837C | 7387 | B389 | F38A |
| B1 | 3388 | 738D | 338E | F38F | B392 | F394 | 3395 | B397 | 7399 | 339A | F39B | B39D | F39E | 339F | B3A4 | 33A9 |
| B2 | B3AB | B3AE | 73B1 | 33B2 | F383 | B3B5 | F3B6 | 3387 | B38A | F3BC | 33BD | B38F | 33D1 | B3D3 | B3D6 | B3DC |
| B3 | 73E1 | 33E2 | F3E3 | 83E5 | F3E6 | 33E7 | 83EA | F3EC | 33ED | B3EF | B3F4 | 33F9 | 83FB | 83FE | 742F | 743B |
| B4 | 743E | 3445 | B447 | 7449 | 344A | F44B | B44D | F44E | 344F | 7452 | 3454 | F455 | 7457 | B459 | F45A | 345B |
| B5 | 745D | 345E | F45F | 7464 | F469 | 746B | B471 | F472 | 7475 | 3473 | 7475 | 3476 | 7477 | 747A | 347C | F47D |
| B6 | 747F | 3489 | B4BB | B4BE | 7491 | 3492 | 7493 | B495 | F496 | 3497 | B49A | F49C | 349D | B49F | 74A2 | 34A4 |
| B7 | F4A5 | 74A7 | B4A9 | F4AA | 34AB | 74AD | 34AE | F4AF | B4B2 | F4B4 | B4B5 | B4B7 | 74B9 | 34BA | F4BB | B4BD |
| B8 | F4BE | 34BF | 74C4 | F4C9 | 74CB | 74CE | B4D1 | B4D2 | 34D3 | 74D5 | 34D6 | F4D7 | 74DA | 34DC | F4DD | 74DF |
| B9 | B4E2 | F4F4 | 34E5 | 84E7 | 74E9 | 34EA | F4EB | B4ED | F4EE | 34EF | 74F2 | 34F4 | F4F5 | 74F7 | B4F9 | F4FA |
| BA | 34E2 | B4FD | 34FE | F4FF | 3511 | B513 | B516 | 851C | 3522 | F523 | B525 | F526 | 3527 | B52A | F52C | 352D |
| BB | B52F | B534 | 3539 | B53B | B53E | 3544 | F545 | 7547 | 3549 | F54A | 354B | 754D | 354E | F54F | B552 | F554 |
| BC | 3555 | B557 | 3559 | 355A | 355B | B55D | F55E | F55F | B564 | 3569 | B56B | B56E | 7571 | 3572 | B573 | B575 |
| BD | F576 | 3577 | 7559 | F57C | 3570 | 857F | 7589 | 7588 | 758E | B591 | 7592 | 3593 | 7595 | 3596 | F597 | 759A |
| BE | 359C | F59D | B57A | B5A2 | F5A4 | 35A5 | B5A7 | 75A9 | 35AA | F5AB | B5AD | F5AE | 35AF | 75B2 | 35B4 | F5B5 |
| BF | 75B7 | B5B9 | F5BA | 35BB | 75BD | 35BE | F5BF | B5C4 | 35C9 | B5CB | B5CE | 75D1 | 35D2 | F5D3 | B6D5 | F5D6 |

Fig. 10 (c)(2)

| LSB SIDE 4BIT / 8BIT MSB SIDE | 0 | 1 | 2 | 3 | 4 | 5 | 6 | 7 | 8 | 9 | A | B | C | D | E | F |
|---|---|---|---|---|---|---|---|---|---|---|---|---|---|---|---|---|
| C0 | 35D7 | B5DA | F5DC | B5DD | 35DF | 75E2 | 35E4 | F5E5 | 75E7 | B5E9 | F5EA | 35EB | 75ED | 35EE | F4EF | B5F2 |
| C1 | F5F4 | 35F5 | B5F7 | 75F9 | 35FA | F5FB | B5FD | F5FE | 35FF | B623 | B626 | B62C | B645 | F646 | 3647 | B64A |
| C2 | F64C | 364D | B64F | B654 | 3659 | B65B | B65E | 3671 | B673 | B676 | B67C | 76B7 | B689 | F68A | 368B | 768D |
| C3 | 368E | F68F | B692 | F694 | 3695 | B697 | B6BA | 369A | F69B | B69D | F69E | 369F | B6A4 | 36A9 | B6AB | B6AE |
| C4 | 76B1 | 36B2 | F6B3 | B6B5 | F6B6 | 3687 | B6BA | F6BC | F69B | B6BF | 36D1 | B6D3 | B6D6 | B6DC | 76E1 | 36E2 |
| C5 | F6E3 | B6E5 | F6E6 | 36E7 | B6EA | F6EC | 36ED | B6EF | 36BD | 36F9 | B6FB | B6FE | 77DB | 770E | B711 | F712 |
| C6 | 3713 | 7715 | 3716 | 3717 | 771A | 371C | F71D | 771F | B722 | F724 | 3725 | B727 | 7729 | 372A | F72B | B72D |
| C7 | F72E | 372F | 3732 | 3734 | 3735 | 7737 | 3739 | F73A | 373B | 773D | 373E | F73F | B744 | 3749 | B74B | B74E |
| C8 | 7751 | 3752 | F753 | B755 | 3756 | 3757 | 375A | F75C | 375D | B75F | 7762 | 3764 | F765 | 7767 | B769 | F76A |
| C9 | F72E | 776D | 376E | F76F | B772 | F774 | 3775 | F777 | 7779 | 377A | F77B | B77D | F77E | 377F | 3791 | B793 |
| CA | 376B | B79C | 77A1 | 37A2 | F7A3 | B7A5 | F7A6 | 37A7 | B7AA | F7AC | 37AD | B7AF | B7B4 | 37B9 | B7BB | B7BE |
| CB | B796 | B79C | F7C5 | 77C7 | B7C9 | F7CA | 37CB | 77CD | 37CE | F7CF | B7D2 | F7D4 | 37D5 | B7D7 | 77D9 | 37DA |
| CC | 77C2 | 37C4 | F7DE | 37DF | B7F4 | 37E9 | B7EB | B7EE | 77F1 | 37F2 | F7F3 | B7F5 | F7F6 | 37F7 | B7FA | F7FC |
| CD | F7DB | B7DD | 784F | 7858 | 785E | 7873 | 7876 | 7889 | 7889 | 388A | F88B | B88D | F88E | 388F | 7892 | 3894 |
| CE | 38FD | 7897 | B899 | F89A | 389B | 789D | 389E | F89F | 78A4 | F8A9 | 78AB | B8AE | B8B1 | F8B2 | 38B3 | 7885 |
| CF | 38B6 | F8B7 | 78BA | 38BC | 38BD | 78BF | F8D1 | F8D3 | 78D6 | 78DC | 78E5 | 38E3 | 78E5 | 38E6 | F8E7 | 78EA |
| D0 | 38EC | F8ED | 78EF | 78F4 | F8F9 | F8FB | 78FE | 7911 | 3912 | F913 | B915 | F916 | 3917 | 891A | F91C | 391D |
| D1 | 891F | 7922 | 3924 | F925 | 7927 | B929 | F92A | 392B | 792D | 392E | F92F | B932 | F934 | 3935 | B937 | 7939 |
| D2 | 393A | F93B | B93D | B93E | 393F | 7944 | F949 | 794B | 794E | B951 | F952 | 3953 | 7955 | 3956 | F957 | 795A |
| D3 | 395C | F95D | 795F | B962 | 3964 | 3965 | B967 | 7969 | 396A | F96B | B96D | F96E | 396F | 7972 | 3974 | F975 |
| D4 | 7977 | B979 | F97A | 397B | 397E | F97E | F97F | F991 | 7993 | F996 | 799C | F9A2 | 39A3 | 79A5 | 39A6 | F9A7 |
| D5 | 79AA | 39AC | F9AD | 79AF | 79B4 | F9B9 | 79BB | 79BE | 79C4 | 39C5 | B9C7 | 79C9 | 39CA | F9CB | B9CD | F9CE |
| D6 | 39CF | 79D2 | 39D4 | 79D5 | 79D7 | B9D9 | 79DA | 39DB | 79DD | 39DE | F3DF | 79E4 | F9E9 | 79EB | 79EE | E9F1 |
| D7 | F9F2 | 39F3 | 79F5 | 39F6 | F9F7 | 79FA | 39FC | F9FD | 79FF | 3A22 | FA23 | BA25 | FA26 | 3A27 | BA2A | FA2C |
| D8 | 3A2D | BA2F | BA34 | 3A39 | BA3B | BA3E | 3A44 | FA45 | 3A47 | BA49 | 3A44 | 3A4B | 7A4D | 3A4E | FA4F | BA52 |
| D9 | FA54 | 3A55 | BA57 | 3A59 | 3A5A | FA5B | BA5D | FA5E | 3A5F | BA64 | FA69 | BA6B | BA6E | 7A71 | 3A72 | FA73 |
| DA | BA75 | 3A76 | 3A77 | BA7A | FA7C | FAAA | BA7F | FA89 | 3A5F | 7A8E | BA91 | FA92 | 3A93 | 7A95 | 3A96 | FA97 |
| DB | 7A9A | 3A9C | FA9D | 7A9F | BAA2 | FAA4 | 3AA5 | BAA7 | 7AA9 | 3AAA | FAAB | BAAD | FAAE | 7AAF | 7AB2 | 3AB4 |
| DC | FAB5 | 7AB7 | BAB9 | FABA | 3ABB | 7ABD | 3ABE | FABF | BAC4 | 3AC9 | BACB | BACE | 7AD1 | 3AD2 | 7AB2 | BAD5 |
| DD | FAD6 | 3AD7 | BADA | FADC | 3ADD | BADF | 3AE2 | 3AE4 | FAE5 | 7AE7 | BAE9 | FAEA | 3AEB | 7AFD | 3AEE | FAEF |
| DE | BAF2 | FAF4 | 3AF5 | BAF7 | 3AF9 | 3AFA | FAFB | BAFD | FAFE | 3AFF | FB11 | 7B13 | 7B16 | 7B1C | FB22 | 3B23 |
| DF | 7B25 | 3B26 | FB27 | 7B2A | 382C | FB2D | 7B2F | 7B34 | FB39 | 783B | 783E | FB44 | 3B45 | BB47 | 7B49 | 3B4A |

Fig. 10 (d)(1)

| LSB SIDE 4BIT\8BIT | 0 | 1 | 2 | 3 | 4 | 5 | 6 | 7 | 8 | 9 | A | B | C | D | E | F |
|---|---|---|---|---|---|---|---|---|---|---|---|---|---|---|---|---|
| E0 | FB4B | BB4D | FB4E | 3B4F | 7B52 | 3B54 | FB55 | 7B57 | BB59 | FB5A | 3B5B | 7B5D | 3B5E | FB5F | 7864 | FB69 |
| E1 | 7B6B | 7B6E | FB71 | FB72 | 7B73 | 7B75 | 3B76 | FB77 | 7B7A | 3B7C | FB7D | 7B7F | 3B89 | 8B8B | 8B8E | 7B91 |
| E2 | 3B92 | FB93 | BB95 | FB96 | 3897 | BB9A | FB9C | 389D | 8B9F | 7BA2 | 3BA4 | FBA5 | 7BA7 | BBA9 | FBAA | 3BAB |
| E3 | 7BAD | 3BAE | FBAF | BBB2 | FBB4 | BBB5 | BBB7 | 7BB9 | 3BBA | FBBB | BB8D | BB8D | 3B8F | 78C4 | FBC9 | 7BCB |
| E4 | 7BCE | BBD1 | FBD2 | 3BD3 | 7BD5 | 3BD6 | FBD7 | 7BDA | 3BDC | FBDD | BB8D | BBE2 | 3BE5 | 3BE5 | BBE7 | 7BE9 |
| E5 | 3BEA | FBEB | BBED | FBEE | 3BEF | 7BF2 | 3BF4 | FBF5 | 7BF7 | BBF9 | FBFA | 3BFB | FBFD | 3BFE | F8FF | 8C45 |
| E6 | FC46 | 3C47 | BC4A | FC4C | 3C4D | BC4F | BC54 | 3C59 | BC5B | BC5E | 3C71 | BC73 | 7C76 | BC7C | 7CB7 | BC89 |
| E7 | FC8A | 3C8B | 7C8D | 3CBE | 3C4D | BC92 | FC94 | 3C95 | BC97 | 7C99 | 3C9A | FC9B | BC9D | FC9E | 3C9F | BCA4 |
| E8 | 3CA9 | BCAB | BCAE | 3CBE | 3CB2 | BCB3 | BCB5 | BCB6 | 3CB7 | BCBA | BCBC | BCBF | 3CBF | 3CD1 | BCD3 | BCD6 |
| E9 | 8CDC | 7CE1 | 3CE2 | 7CB1 | BCE5 | BCE6 | 3CE7 | BCEA | FCEC | 3CED | BCEF | BCF4 | BCF9 | BCF8 | BCFE | 7DDB |
| EA | 7DDE | FD11 | FD12 | FCE3 | BCE5 | 3D16 | FD17 | 7D1A | 3D1C | FD1D | BCEF | BD22 | FD24 | BD25 | BD27 | 7D29 |
| EB | BD1 | FD2B | FD12 | 3D13 | 7D15 | 3D32 | 3D34 | FD35 | 3037 | BD39 | FD3A | 3D3B | 3D3D | 3D25 | FD3F | BD44 |
| EC | 3049 | FD2B | BD2D | FD2E | 3D2F | FD53 | BD55 | FD56 | 3D57 | BD5A | FD5C | 3D5D | BD5F | 3D62 | 3D64 | FD55 |
| ED | 7D67 | FD2B | BD4B | 7D51 | 3D52 | 3D6E | FD6F | BD72 | FD74 | 3075 | BD77 | 7D79 | BD7A | 7D62 | BD7D | FD07E |
| EE | 3D7F | 3D91 | BD4E | FD2E | 7D6D | 7DA1 | 3DA2 | FDA3 | FDA5 | FDA6 | 3DA7 | BDAA | FDAC | 3DAD | 8DAF | BDB4 |
| EF | 3DB9 | BDBB | 8D93 | 7DC2 | 8D9C | FDC5 | 7DC7 | BDC9 | FDCA | 3DCB | 7DCD | 3DCE | FDCF | BDD2 | FDD4 | 3DD5 |
| F0 | BDD7 | BDD9 | 3DDA | FDDB | BDDD | FDDE | 3DDF | BDE4 | 3DE9 | BDEB | BDEE | 7DF1 | 3DF2 | FDF3 | BDF5 | FDF6 |
| F1 | 3DF7 | BDFA | FDFC | 3DFD | 8DFF | 7E13 | 7E16 | 7E1C | FE22 | 3E23 | 7E25 | 3E26 | FE27 | 7E2A | 3E2C | FF2D |
| F2 | 7E2F | 7E34 | FE39 | 7E3B | 7E3E | FE44 | 3E45 | 7E49 | 3E4A | FE4B | FE4D | BE4D | FE4E | 3E4E | 7E52 | 3E54 |
| F3 | FE55 | 7E57 | BE59 | FE5A | 3E5B | 7E5D | 3E5E | FE5F | 7E64 | FE69 | 7E6B | 7E6E | BE71 | FE72 | 3E73 | 7E75 |
| F4 | 7E76 | 7E77 | 7E7A | 3E7C | 3E7D | 7E7F | 3E89 | BE8B | BEBE | 7E91 | 3E92 | FE93 | BE95 | FE96 | 3E97 | BE9A |
| F5 | FE9C | 3E9D | BE9F | 7EA2 | 3EA4 | FEA5 | 7EA7 | BEA9 | EEAA | 3EAB | 7EAD | 3EAE | FEAF | 8EB2 | FEB4 | 3EB5 |
| F6 | BEB7 | 7EB9 | 3EBA | FEBB | BEBD | FEBE | 3EBF | 7EC4 | FEC9 | 7EC8 | 7ECE | 8ED1 | FED2 | 3ED3 | 7ED5 | 3ED6 |
| F7 | FED7 | 7EDA | 3EDC | FEDD | 7EDF | BEE2 | FEE4 | 3EE5 | BEE7 | 7EE9 | 3EEA | FEEB | BEED | FEEE | 3EEF | 7EF2 |
| F8 | 3EF4 | FEF5 | 7EF7 | BEF9 | FEFA | FEBE | 3EFD | 3EFE | BEFF | 3F11 | BF13 | BF16 | BF1C | 7F21 | 3EEF | FF23 |
| F9 | BF25 | FF26 | 3F27 | BF2A | FF2C | 3F2D | BF2F | BF34 | 3F39 | 8F3B | 8F3E | 7F42 | 3F44 | FF45 | 3F22 | BF49 |
| FA | FF4A | 3F4B | 7F4D | 3F4E | FF4F | BF52 | FF54 | 3F55 | BF57 | 7F59 | 3F5A | FF5B | 8F5D | FF5E | 7F47 | BF64 |
| FB | BF6B | BF6B | 8F6E | 7F71 | 3F72 | BF73 | 8F75 | BF76 | BF77 | BF7A | BF7C | 3F7D | 8F7F | FF89 | 3F5F | 7FBE |
| FC | 3F91 | FF92 | 3F93 | 7F95 | 3F96 | FF97 | 7F9A | BF9C | FF9D | BF7A | BFA2 | 3F7D | 3FA5 | 8FA7 | 7F8B | 7FBE |
| FD | FFAB | FFAD | FFAE | 3FAF | 7FB2 | 3FB4 | FFB5 | 7FB7 | BFB9 | FFBA | 3FBB | 7FBD | 3FBE | FFBF | 3FA9 | 3FAA |
| FE | BFCB | BFCE | 7FD1 | 3FD2 | FFD3 | 8FD5 | FFD6 | 3FD7 | BFDA | FFDC | 3FDD | 7FBD | 7FE2 | 3FE4 | FFE5 | 3FC9 |
| FF | BFE9 | FFEA | 3FEB | 7FED | 3FEE | FFEF | BFF2 | FFF4 | 3FF5 | BFF7 | 7FF9 | 3FFA | FFFB | BFFD | FFFE | 3FFF |

Fig. 10 (d)(2)

| INPUT SIGNAL | CODE | |
|---|---|---|
| | CDS = -1 | CDS = +1 |
| 000 | 001111001100010 | 110000110011101 |
| 001 | 001111001100100 | 110000110011011 |
| 002 | 001111001101000 | 110000110010111 |
| 003 | 001111001000110 | 110000110111001 |
| 004 | 011110000101100 | 100001111010011 |
| 005 | 011110010000110 | 100001101111001 |
| 006 | 010011001100110 | 101100110011001 |
| 007 | 010101101011000 | 101010010100111 |
| 008 | 010101010101010 | 101010101010101 |
| 009 | 100101100010110 | 011010011101001 |
| 00A | 100101000111010 | 011010111000101 |
| ⋮ | ⋮ | ⋮ |
| FFE | 101010101010010 | 010101010101101 |
| FFF | 101010101010100 | 010101010101011 |

Fig. 15

$L_H \fallingdotseq (2 \times f(PILOT)/V_h) \times n$

RELATIONSHIP BETWEEN MAGNETIC HEAD AND RECORDING TRACKS

DATA CONVERSION METHOD, PILOT SIGNAL FORMATION METHOD USING THE SAME ROTARY MAGNETIC HEAD DEVICE FOR USE THEREIN

This application is a divisional of application Ser. No. 08/287,918, filed on Aug. 9, 1994, and now U.S. Pat. No. 5,570,248, which is a divisional of application Ser. No. 08/120,857, filed on Aug. 31, 1993, now U.S. Pat. No. 5,365,232, which is a continuation of application Ser. No. 07/743,888, filed on Aug. 12, 1991, and now abandoned, the entire contents of which are hereby incorporated by reference.

BACKGROUND OF THE INVENTION i. Field of the Invention

The present invention relates to a data conversion method for converting digital data into suitable signals for a recording or transmission system in recording or transmitting the digital data, a pilot signal formation method using the data conversion method for obtaining a tracking error signal in a magnetic recording and reproducing apparatus such as a digital VTR (video tape recorder) system or the like, and a rotary magnetic head device for use in the magnetic recording and reproducing apparatus.

ii) Description of the Related Arts

A conventional data conversion system, for example, an 8/10 modulation system has been developed, as disclosed in "The Dat Conference Standard", June, 1987.

In the conventional 8/10 modulation data conversion system, digital data is delimited by data words of 8 bits, and the data words are converted into code words of 10 bits, as shown in FIGS. 1 to 3. In FIG. 1, a data word a of 8 bits and a first table selection signal Q' of 1 bit are input to an encoder 1, and the encoder 1 outputs a code word b of 10 bits and a second table selection signal Q of 1 bit for a next code word. A flip flop 2 receives the second table selection signal Q for the code word b and delays the table selection signal Q for one data word a.

In the encoder 1, for instance, a data conversion table shown in FIG. 2 for converting the data words into code words is stored in a ROM (read only memory) or the like. In the data conversion table, 256 data words of hexadecimal codes of "00" to "FF" correspond to code words of CDS (code word digital sum)=0 in one-to-one relation and also to the code words of CDS∝0 with reference to a pair of CDS values of +2 and −2, and tables Q'=−1 and Q=+1 are composed of data words of CDS=+2 and CDS=−2, respectively. The signal Q selects the CDS (table) so as to suppress divergence of charges in a code word string.

In FIG. 3, signals a, b and Q correspond to those at the points a, b and Q in FIG. 1, and a signal c is obtained after a NRZI (non-return-to-zero inverse) modulation where inversion is carried out by data "1". A signal d represents DSV (digital sum variation) at the end of each code word after the NRZI modulation.

The operation of the 8/10 modulation system described above will now be described in detail.

First, when an 8 bit data word a of FF and a first table selection signal Q'=−1 are input to the encoder 1, the encoder 1 outputs a 10 bit code word b of 1111101010 having a CDS=+2 corresponding to FF of the signal Q'=−1 and a second table selection signal Q=−1. Then, the 10 bit signal is converted from a parallel signal into a serial signal, and the NRZI modulation of the serial signal is carried out. Hence, the DSV value of the end of the code word becomes +2.

Then, when a data word a of 00 is input to the encoder 1, a 10 bit code word b of 0101010101 having a CDS=0 corresponding to 00 of the signal Q'=−1 resulted from delaying the just preceding output signal Q=−1 by one symbol in the flip flop 2, and a signal Q=1. As a result, the DSV value of the end of the code word b after the NRZI modulation is +2.

Next, when a data word a of 11 is input to the encoder 1, a 10 bit code word b having a CDS=−2 corresponding to 11 of the signal Q'=1 and a signal Q=−1. Accordingly, the DSV value of the end of the code word b after the NRZI modulation is 0. That is, in general, when an 8 bit data word a is input to the encoder 1, the encoder 1 outputs a code word b selected from either the table where Q'=−1 or Q'=1 corresponding to the data word a according to a first table selection signal Q output right before, and as a result, a DSV value at the end of each code word b after the NRZI modulation is restricted to 0 or ±2n. This means that the divergence of the DSV is suppressed, and as a result, a DC free data conversion excluding any direct current component can be realized.

In the conventional data conversion system, as described above, since the CDS values of the code words obtained in the conversion are selected from only 0 and +2, the suppression control of the DSV values for the code words can not be positively or actively carried out, and the spectrum of the code word includes relatively low frequency components. Further, when a DSV control circuit is provided to use a DSV value as one of data, the DSV value can not be controlled every code word.

In FIGS. 4 and 5, there is shown a pilot signal formation circuit and a tracking error detecting circuit for use in producing a tracking error in a conventional magnetic recording and reproducing apparatus, as disclosed in Japanese patent laid-open No.Sho 59-68862. As shown in FIG. 4, a reference oscillator 101 for generating a reference signal, a presetable counter 102, a flip flop 103, a filter 104 and a mixer 105 for adding a reference sine wave signal 106 output from the filter 104 and a data signal 107 representing an audio or visual signals are connected in series. A magnetic head 109 for carrying out the recording or reproducing of a signal onto or from a magnetic medium 122, such as a magnetic tape, is coupled with the mixer 105 through a turnover switch 108 for selecting recording or reproducing, and a frequency dividing ratio controller circuit 10 receives a track switch signal 111 and a record and reproduction switch signal 112 and controls the frequency dividing ratio of the presetable counter 102.

A low pass filter 113 for inputting a reproduction signal 114 fed from the magnetic head 109 via the turnover switch 108, a mixer 115 for adding the reproduction pilot signal output from the low pass filter 113 and the reference signal 106 fed from the filter 104, an amplifier 116 and a divider circuit 117 are connected in series. The divider circuit 117 outputs a signal to a pair of envelope detector circuits 119a and 119b through respective band pass filters 118a and 118b, and a differential amplifier 120 receives the output signals of the two envelope detector circuits 119a and 119b and compares them to output a tracking control signal 121. FIG. 5 illustrates the magnetic medium 122 such as the magnetic tape and the magnetic head 109 which is movable along recording tracks 123 on the magnetic tape in the conventional magnetic recording and reproducing apparatus.

The operation of the conventional magnetic recording and reproducing system shown in FIGS. 4 and 5 will now be described in detail.

First, in the recording of a signal onto a magnetic tape, the frequency dividing ratio of the presetable counter 102 is switched by the frequency dividing ratio controller circuit 110 according to the track switch signal 111, and the output signal of the presetable counter 102 is further frequency-divided by the flip flop 103. The filter 104 receives the output signal of the flip flop 103 and outputs the reference sine wave signal (pilot signal) 106 to the mixer 105, and the mixer 105 adds the reference signal 105 and the data signal 107 to output a recording signal to the magnetic head 109 via the turnover switch 108. The magnetic head 109 records the recording signal onto the magnetic tape 122.

In this case, since the track switch signal 111 is changed every time the recording track is changed, for example, four kinds of pilot signals f1, f2, f3 and f4 can be recorded onto the magnetic tape, as shown in FIG. 5. In this instance, it is necessary to determine the frequencies of the pilot signals from, for instance, several tens of kHz to several hundreds of kHz, so that the data signal 107 may not be damaged when the pilot signal is extracted and the data signal 107 is reproduced.

By determining the frequencies of the four pilot signals f1 to f4 to the following formulas in consideration of a 4 frequency pilot system of an 8 mm VTR (video tape recorder) for public use, $$f1+fA=f2, f2+fB=f3 \ldots \quad (1)$$

$$f4+fA=f3, f1+fB=f4 \ldots \quad (2)$$

when the recording signal is reproduced from the magnetic tape by the magnetic head 109 shown in FIG. 4 in a reproducing mode, the pilot signal mixed with the data signal 107 recorded onto the magnetic tape is also reproduced. This pilot signal can be extracted by the low pass filter 113, and at this time, not only the pilot signal for the track now being scanned by the magnetic head 109 but also the pilot signals of both adjacent tracks thereto are picked up as crosstalk.

Since the frequency of the pilot signals of the adjacent tracks is low enough compared with the video signal or the like, for example, even in an azimuth recording, the azimuth effect will be negligible, and thus the pilot signals of the adjacent tracks can be reproduced as a large crosstalk amount. When the pilot frequency of the reference signal 106 written in the scanning track is added to the pilot signals reproduced as above in the mixer 115, a beat is caused between the reference signal 106 and the pilot signals due to the crosstalk of the adjacent tracks, and beat frequencies of the beat signals fA and fB in formula (1) above-described can be obtained.

As shown in FIG. 5, for instance, on reproducing the track 123 in which the pilot signal having the frequency f2 is written, the pilot signals having the frequencies f1 and f3 can also be obtained as crosstalk, and, when the pilot signals are added to the reference signal 106 in the mixer 115, the beat signals fA and fB can be obtained from above formulas (1) and (2) such as f2−f1=fA and f2−f3=−fB.

Next, the output signal of the mixer 115 is fed through the amplifier 116 and the divider circuits 117 end is extracted in the band pass filters 118a and 118b. Then, the filtered signals are detected in the envelope detector circuits 119a and 119b. At this time, while the magnetic head 109 scans on-track along the track of the signal f2, when the magnetic head 109 is shifted a slight amount toward the f1 side, the beat signal fA increases, or a slight amount toward the f3 side, the beat signal fB increases, and hence the output signal of the differential amplifier 120 can be output as the tracking control signal 121.

In the conventional magnetic recording and reproducing apparatus as described above, high density recording or reproducing is carried out, and a tracking system with extremely narrow tracks is provided. Hence, in this case, a device capable of detecting a track shift with high accuracy is required, and in general, as described above, by recording the low frequency pilot signals, the track shift can be detected. However, in the case of digital magnetic recording, there is a power spectrum extending over a wide frequency range from near direct current to a maximum recording frequency in usual recording and reproducing, and thus a gap in the so-called frequency allocation can not be formed outside the range of a carrier and its periphery as in conventional analog FM recording. In particular, in a digital recording, it is difficult to insert a low frequency pilot signal for tracking into a gap in the frequency allocation like present analog 8 mm VTR.

When the power level of the pilot signal recorded in the frequency range of the pilot signal for tracking is large enough compared with the power level of the recording signal obtained by modulating the digital data even in the digital recording, the pilot signal for tracking can be extracted by a band pass filter or the like and reproduced in the same manner as a conventional example.

However, in the case where the power level of the pilot signal is enlarged too much with reference to the recording or reproducing signal of visual or audio data as described above, when the signal is demodulated during reproducing, the wave form deformation is enlarged and the error rate of the digital data increases. Particularly, when the digital data after the modulation and the pilot signal for tracking are added in an analog way before being input to the recording amplifier, since there is no relationship between the digital data and the pilot signal, the two signals mutually act as only disturbance signals.

That is, in a digital data recording and reproducing apparatus such as a digital audio recorder or a digital video recorder, the frequency spectrum of a recording or reproducing signal includes many low frequency components due to a feature of digital recording, and, when a low frequency pilot signal for tracking is added to the recording or reproducing signal to record the added signal, since there is no relationship between the recording or reproducing signal and the pilot signal, a wave form deformation is caused when demodulating the modulated digital signal, and the data error rate increases.

In order to reduce the wave form deformation caused in the demodulating, the power level of the pilot signal is lowered, and a necessary S/N ratio for a servo (tracking) detection signal can not be obtained. Accordingly, the servo can not be given, and the recording density in the tracking direction in the magnetic tape can not be gained.

In FIG. 6, there is shown a conventional rotary magnetic head device, as disclosed in Japanese patent laid-open No.Sho 58-47383. FIG. 7 shows a track pattern recorded on a recording medium such as a magnetic tape by the rotary magnetic head device shown in FIG. 6, and in this instance, the recording is carried out without any guard band, adjacent two tracks having different azimuth angles. As shown in FIG. 6, two double azimuth heads 202 each composed of a pair of heads $H_{L1}$ and $H_{H1}$ or $H_{L2}$ and $H_{H2}$ having different azimuth angles are arranged on the periphery of a rotary drum 201. The pairs of heads $H_{L1}$, $H_{H1}$, $H_{L2}$ and $H_{H2}$ are aligned in opposite positions through 180° with reference to the central axis of the rotary drum 201, and the pair of heads $H_{L1}$ and $H_{H1}$ or $H_{L2}$ and $H_{H2}$ are arranged at a distance away from each other corresponding to 6H (H means a horizontal scanning period) time. A recording medium 203 such as a magnetic tape is wound around approximately half the rotary drum 201.

The operation of the conventional rotary magnetic head device shown in FIGS. 6 and 7 will now be described in detail.

First, in a recording mode, a composite color signal composed of a luminance signal and a color signal multiplied by each other is divided into two system signals such as a low range signal SL including a signal representing a brightness component and a high range signal SH including a color signal component (carrier color signal) and a high range luminance signal component, and the low and high range signals SL and S11 are frequency-modulated. Then, the modulated low and high range signals are input to the double azimuth head 202 composed of two heads $H_{L1}$ and $H_{H1}$ or $H_{L2}$ and $H_{H2}$ arranged on the rotary drum 201 and are recorded in two channels on the recording medium 203. In this instance, the divided two range signals SL and SH are passed through two different systems, and hence their delay times can be different on reproducing. Hence, a timing-axis adjustment may be required, and as reference signals for the timing-axis adjustment, a burst signal and a horizontal synchronizing pulse (PH) are used for the low range signal SL and the high range signal SH, respectively. The PH signal is a low frequency signal with negligible azimuth effect. As a result, as shown in FIG. 7, by determining the head distance between the two heads $H_{L1}$ and $H_{H1}$ or $H_{L2}$ and $H_{H2}$ to 6H, the H-alignment is achieved in the tracking pattern recorded on the recording medium 203. Hence, even when the crosstalk is increased in the PH portions by mistracking, such sections correspond to the horizontal blanking periods, and no image quality deterioration by the crosstalk will be caused.

However, in the conventional rotary head device as described above, when the head device is applied to the digital recording, there is no signal corresponding to the horizontal synchronizing signal, and thus an appropriate tracking error signal can not be obtained. Further, a determination of the head interval in the double azimuth head is newly required.

SUMMARY OF THE INVENTION

Accordingly, it is an object of the present invention to provide a data conversion method in view of the above-described problems of the prior art, which is capable of controlling a DSV value every code word, and reducing relatively low frequency components in a spectrum of a code word to achieve a DC free data conversion.

It is another object of the present invention to provide a pilot signal formation method for forming a tracking error signal in a magnetic recording and reproducing system, in order to prevent problems of the prior art, which is capable of largely reducing wave form deformation in demodulating a signal by adding pilot signals to a data signal, obtaining a large S/N ratio of a servo detection signal and narrowing a tracking pitch to achieve high density recording and reproducing.

It is a further object of the present invention to provide a rotary magnetic head device for use in a magnetic recording and reproducing apparatus using a double azimuth head, free from the aforementioned defects and disadvantages of the prior art, which is capable of obtaining an appropriate tracking error signal for use in narrowing the tracking pitch to realize high density recording and reproducing, and obtaining a suitable determination condition of the distance between the two heads constituting the double azimuth head.

In accordance with one aspect of the present invention, there is provided a data conversion method from m bits of data words into n bits of code words, n being larger than m, comprising restricting the number of bits with a value "0" arranged between one bit value "1" and another bit value "1" to at most 4 in a code string of each 16 bit code word; allowing a pair of groups of the "1" bits of code words corresponding to CDSs (code word digital sum) of two codes +−1 and −1 to correspond to the m bits of data words; and selectively using one of the two codes +1 and −1 according to a DSV (digital sum variation) control signal to convert the m bits of data word into the n bits of code word.

In accordance with another aspect of the present invention, there is provide a pilot signal formation method for obtaining a tracking error signal in a magnetic recording and reproducing apparatus in which digital signals are recorded or reproduced onto or from a magnetic medium by using a rotary magnetic head device mounted on a rotary drum, comprising allowing a pair of groups of n bits of code words corresponding to CDSs (code word digital sum) of two codes +1 and −1 to correspond to m bits of digital signals in a data conversion from the m bits of two-value digital signals into the n bits of code words, n being larger than m, in a recording; and controlling a DSV (digital sum variation) of a string of digital data by using a selected one of the two codes +1 and −1 according to a DSV control signal, an initial phase of the DSV control signal being preset by a signal synchronized with a drum PG signal for controlling the phase of the drum to form a pilot signal synchronized with the digital data.

In accordance with a further aspect of the present invention, there is provided a pilot signal formation method for obtaining a tracking error signal in a magnetic recording and reproducing apparatus in which digital signals are recorded or reproduced onto or from a magnetic medium by using a rotary magnetic head device mounted on a rotary drum, comprising allowing a pair of groups of n bits of code words corresponding to CDSs (code word digital sum) of two codes +1 and −1 to correspond to m bits of digital signals in a data conversion from the m bits of two-value digital signals into the n bits of code words, n being larger than m, in a recording; selecting of two kinds of DSV (digital sum variation) control signals, formed by counting a code conversion cycle, by a drum PG signal for controlling the phase of the drum; and making the I)SV at the end of the code word 0 every predetermined cycle by using a selected one of the two codes +1 and −1 according to the selected DSV control signals to form two kinds of pilot signals so that the frequency of the pilot signal is alternately changed every recording track.

In accordance with still another aspect of the present invention, there is provided a rotary magnetic head device for use in a magnetic recording and reproducing apparatus, comprising a double azimuth head including a pair of head members having different azimuth angles for recording and reproducing a two-channel signal obtained by multiplying a data signal With a pilot signal, wherein an interval of the two head members is an integral number of times as much as approximately a wavelength of the pilot signal.

BRIEF DESCRIPTION OF THE DRAWINGS

These and other objects, features and advantages of the present invention will more fully appear from the following description of the preferred embodiments with reference to the accompanying drawing, in which:

FIG. 2 shows a data conversion table used in the data conversion system shown in FIG. 1;

FIG. 9 shows code word numbers obtained under certain conditions in the data conversion system shown in FIG. 8;

FIGS. 10(a) (1), 10(a) (2), which will be collectively referred to as FIG. 10(a); FIGS. 10(b)(1), 10(b)(2), collectively referred to as FIG. 10(b); FIGS. 10(c) (1), 10(c) (2), collectively referred to as FIG. 10(c); and FIGS. 10(d) (1), 10(d) (2), collectively referred to as FIGS. 10(d) collectively show conversion tables for use in the data conversion system shown in FIG. 8.

FIG. 15 shows code words of original data for use in the circuit shown in FIG. 14;

DESCRIPTION OF THE PREFERRED EMBODIMENTS

Figure 1:
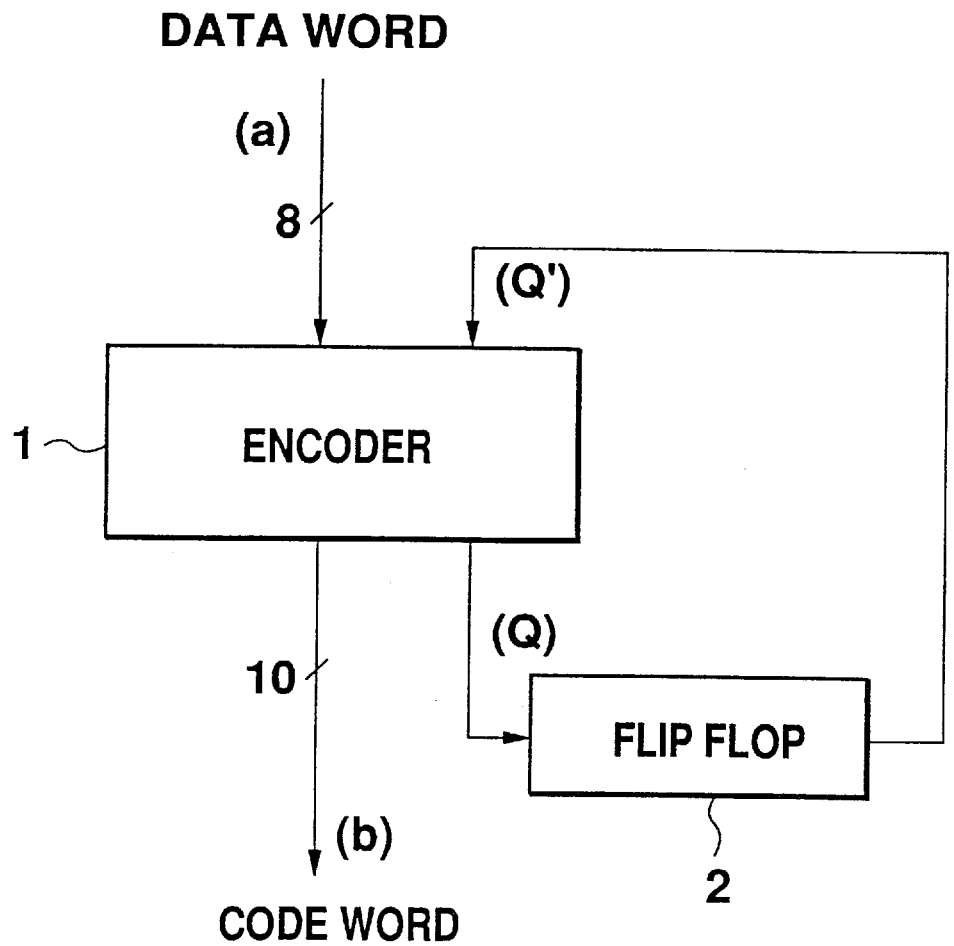
FIG. 1 is a schematic block diagram of a circuit structure for a conventional data conversion system.
Figure 3:
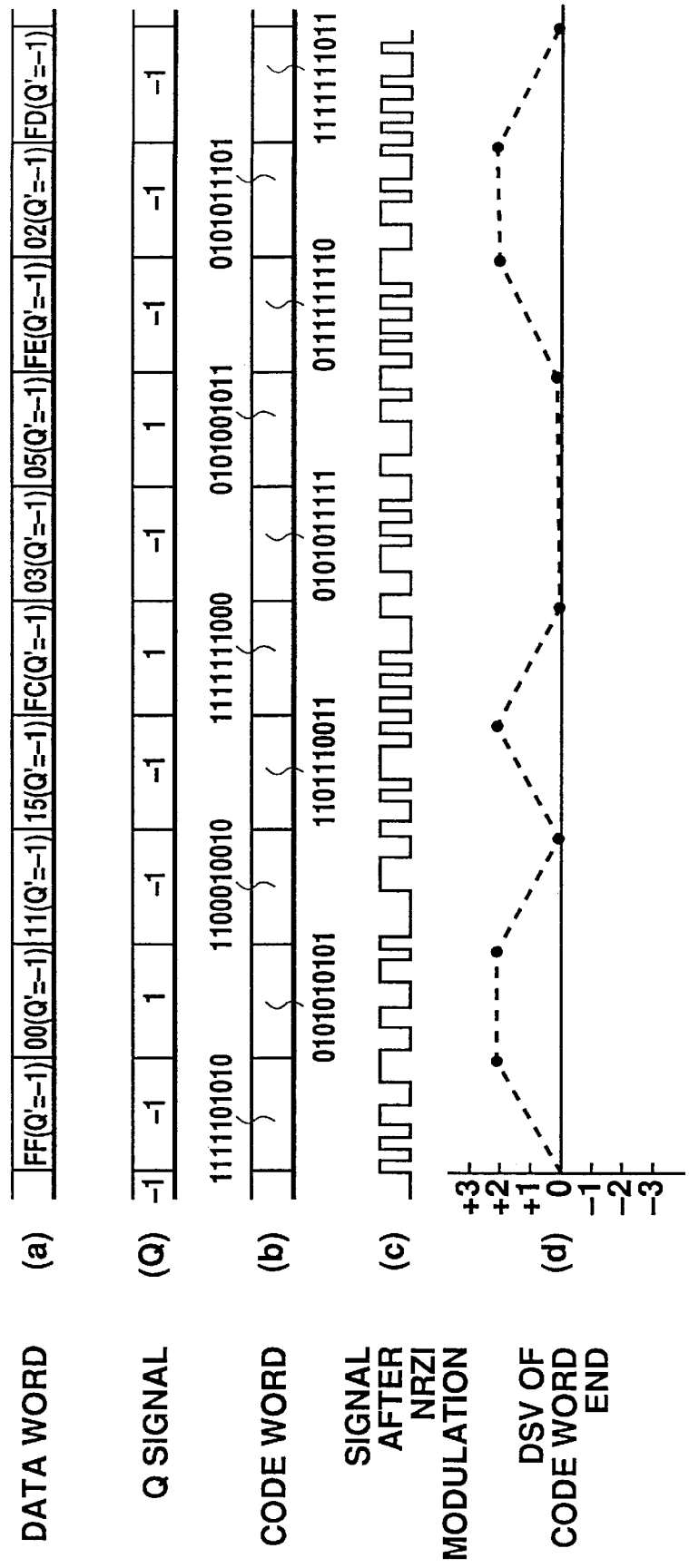
FIG. 3 is a schematic chart for explaining the operation of the data conversion system shown in FIG. 1.

The present invention will now be described with reference to the accompanying drawings, wherein like reference characters designate like or corresponding parts throughout the several views and thus the repeated description thereof can be omitted for brevity.

Now, codes satisfying the conditions that a data word length m=12; a code word length n=15; and Tmax/Tmin=5, will be formed. In this case, it is defined that d (the minimum number of "0" between any "1" and the next "1")=0, and k (the maximum number of "0" between any "1" and the next "1")=4. The NRZI (non-return-to-zero inverse) (F) rule is applied to the codes. Hence, in order to satisfy k =4, the maximum number of continuous "0" in each code word is at most 2 in the MSB (most significant bit) side and the LSB (least significant bit) side and is also at most 4 within the code word itself. In this case, in the code words in which the MSB starts from "0", the code word numbers satisfying the "0" run-length condition are shown in FIG. 9.

In this embodiment, although the data word length m and the code word length n (n>m) are selected to 12 and 15, respectively, the present invention is not restricted to these values, and any numbers can, of course, be used within the scope of the present invention.

Now, in order to form DC (direct current) free codes, by considering code words having different polarities of the CDS (code word digital sum) as one pair, $2^{12}$ (4096) codes are sufficient. The code word numbers shown in FIG. 9 are only of e code words whose MSB is "0". Hence, by replacing the MSB with "1" in place of "0", the code words having the inverse polarity of CDS and satisfying the "0" run-length condition can be obtained. Consequently, only by the use of the above-described code words with CDS±1, can the data words=$2^{12}$ (4096)<code word number=4616 be obtained. By using only the code words with the MSB="0" and the CDS=±1 and controlling the MSB to either "0" or "1", the divergence of the DSV (digital sum variation) can be suppressed. Also, the control of the MSB can be settled by checking up the CDS data ("1" by +1 and "0" by −1) of the code words converted right before and the level data ("1" at high level and "0" at low level) at the end of the code word after the NRZI modulation on the basis of a control signal command. Thus the obtained code conversion table is shown in FIGS. 10a to 10d.

In FIGS. 10a to 10d, two-value digital signals are shown by hexadecimal codes. As to the 12 bits of input data words, when the MSB of the code word is "0", the CDS data is represented by 1 bit, and the level data (hereinafter referred to as "Q" and the start end of the code word starts from 0 level) at the end of the code word after carrying out the NRZI modulation of the converted serial data is represented by 1 bit, and the remaining 14 bits correspond to the LSB to the 14th bit of the code word.

Figure 8:
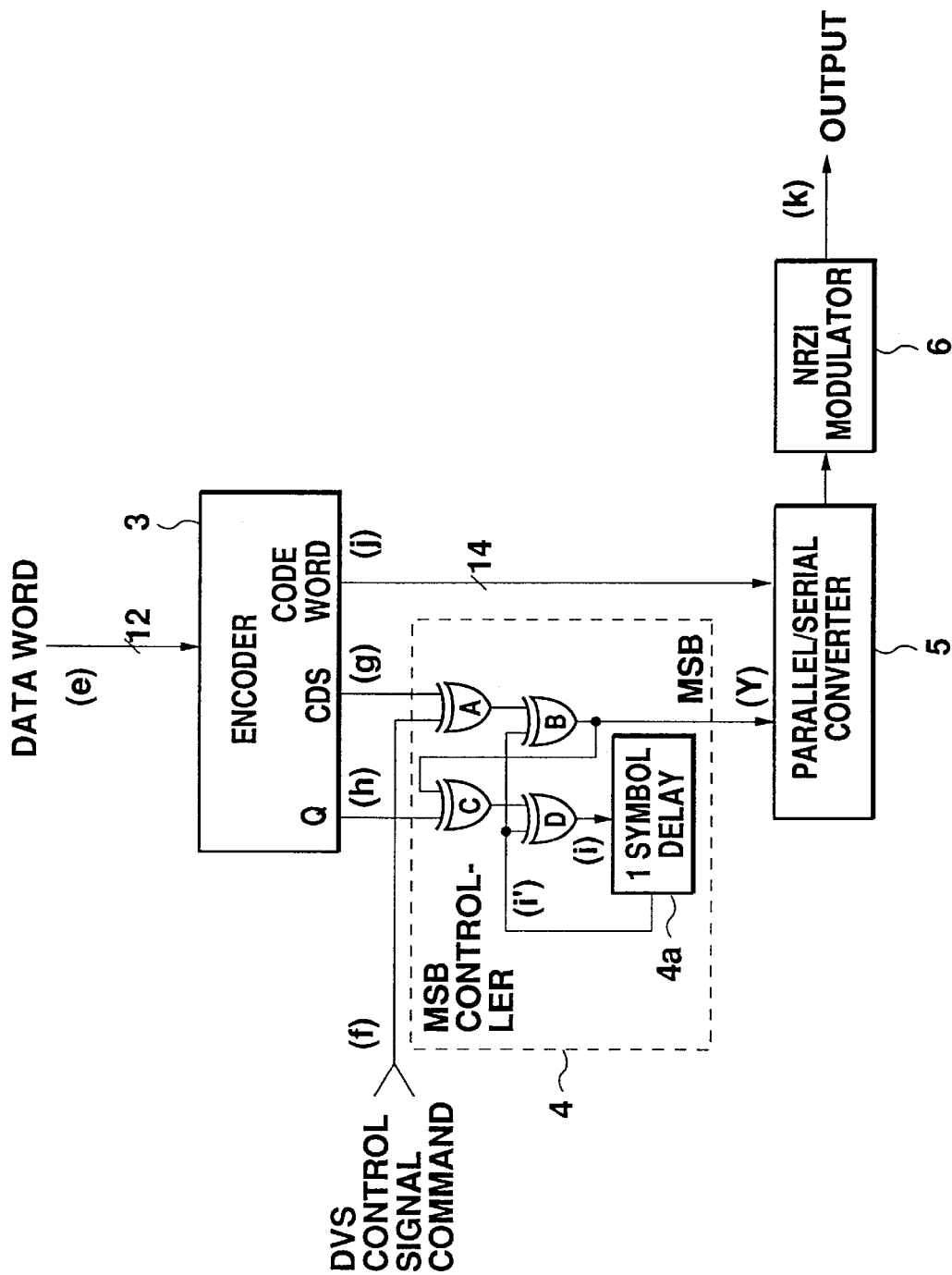
FIG. 8 is a circuit diagram of a data conversion system according to the present invention.
Figure 10B:
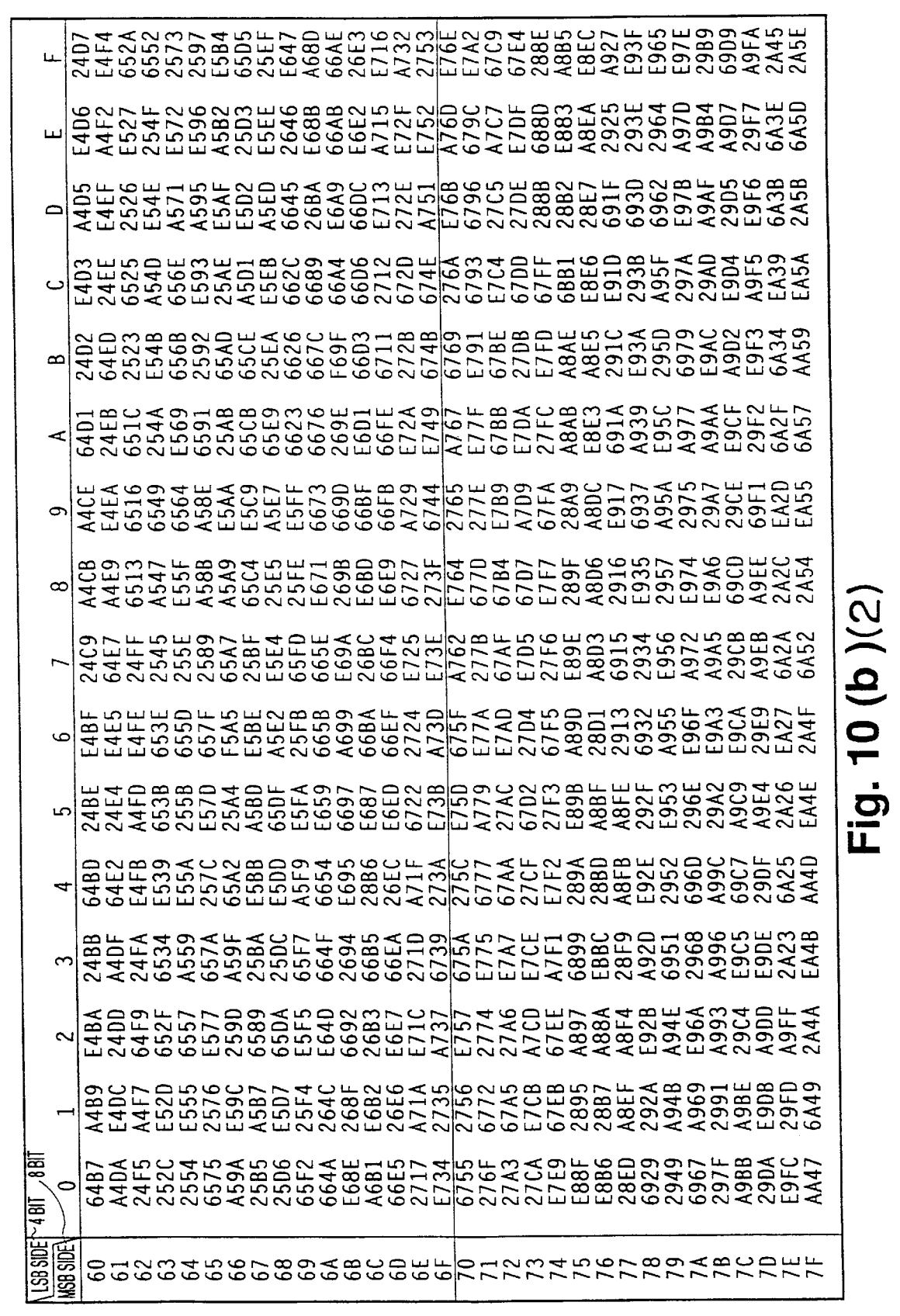
Figure 11:
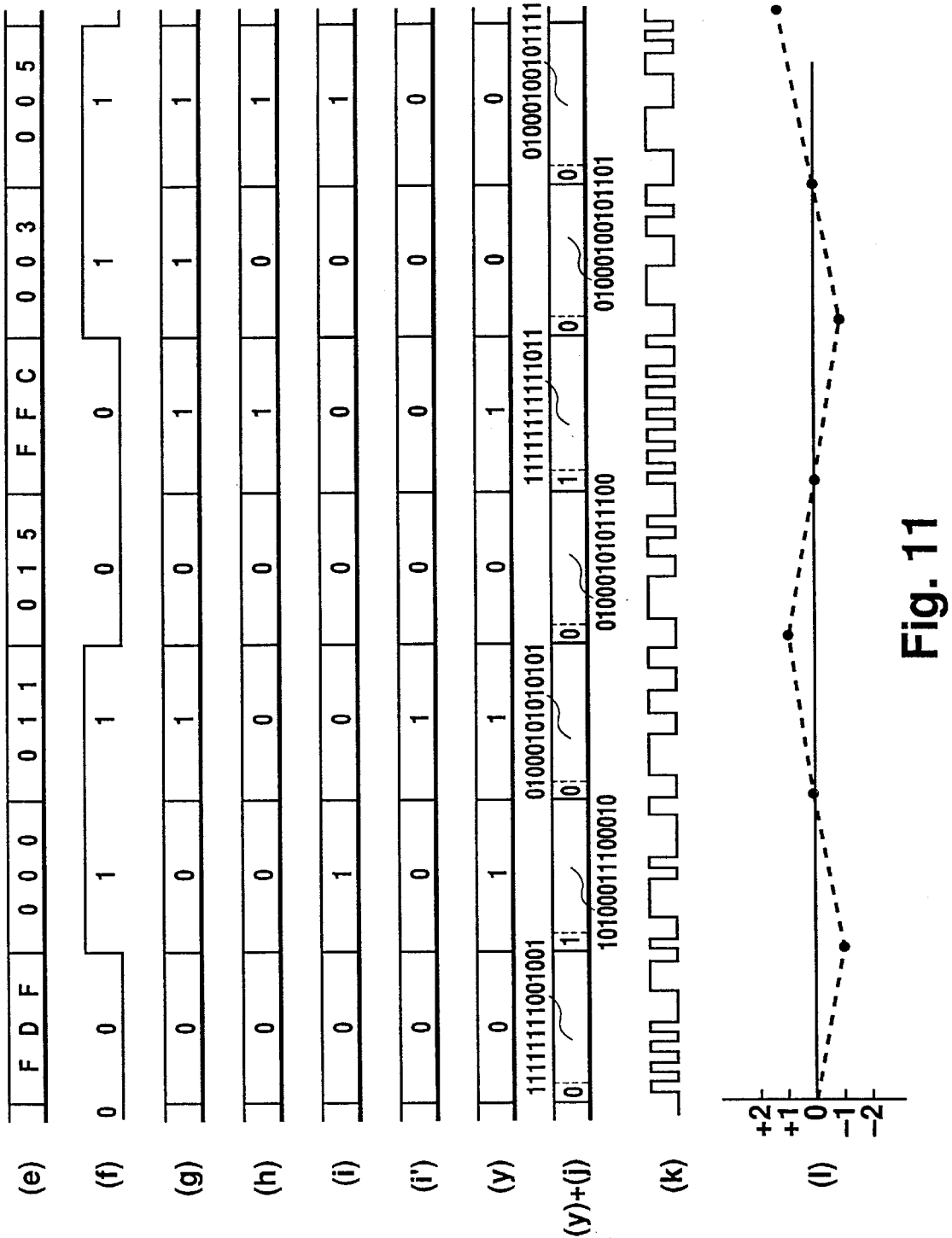
FIG. 11 is a schematic chart for explaining an operation of the data conversion system shown in FIG. 8.

In FIG. 8, there is shown one embodiment of a data conversion system according to the present invention. An encoder 3 includes the code conversion table shown in FIGS. 10a to 10d. The encoder 3 receives 12 bits of digital data or data words and converts the data words into 16 bits of digital data or code words shown in the code conversion table shown in FIGS. 10a to 10d. A MSB controller 4 includes four EXOR circuits A, B, C and D and a one symbol (code word) delay circuit 4a. The MSB controller 4 receives CDS and Q output from the encoder 3 and a DSV control signal command and outputs a signal Y representing a MSB level. A parallel-serial (P/S) converter 5 receives 14 bits of code words output from the encoder 3 and the signal Y output from the MSB controller 4 and converts 15 bits of parallel data into a serial data string to output a serial code word to an NRZI modulator 6. The NRZI modulator 6 processes the serial data string of the code word so as to repeat an inversion every "1" level to output a modulated signal. In FIG. 11, there are shown signals at the points (e), (f), (g), (h), (i), (i'), (Y), ((Y)+(j)) and (k) which appear in FIG. 8 along with (l) DSV values at the end of a code word.

The operation of the data conversion according to the present invention will now be described in detail in connection with FIGS. 8 to 11.

First, in the initial set state, the output (i') of the 1 symbol delay 4a of the MSB controller 4 and the output of the NRZI modulator 6 are reset to a "0" level. In this state, when a data word (e) of FDF is input to the encoder 3, the encoder 3 outputs 14 bits of code word composed of the LSB to the 14th bit, 1 bit of CDS signal and 1 bit of Q signal corresponding to the code word in the form of a total of 16 bits of signal of 3FC9 obtained by the code conversion table shown in FIGS. 10a to 10d.

The detail of the 16 bits of signal of 3FC9 is as follows. That is, the MSB bit of the 4 bits 0011 of 3 is the Q signal for the code word, and "0" and "1" represent a low level and a high level, respectively, of the end of the code word after the NRZI modulation when the MSB of the code word is "0" (the start end of the code word starts from a low level in the NRZI modulation). The second bit from the MSB of the 4 bits 0011 of 3 is the CDS signal of the code word, and "0" and "1" represent −1 and +1, respectively, when the MSB of the code word is "0". The lower two bits of the 4 bits 0011 of 9 correspond to the 14th and 13th bits of the code word. Then, 4 bits 1111 of F, 4 bits 1100 of C and 4 bits 1001 of 9 successively correspond to 12th to 9th bits, 8th to 5th bits and 4th to the LSB, respectively, of the code word.

The 14 bits of code word (j) are sent to the P/S converter 5, and the Q signal (h) and the CDS signal (g) together with the DSV control signal command (f) are fed to the MSB controller 4. In the MSB controller 4, the MSB of the code word is determined as hereinafter described in detail and is output as the Y signal to the P/S converter 5.

The DSV control signal command (f) is set to "1" (high level) or "0" (low level) when the divergence of the DSV is carried out in the (+) direction or the (−) direction, respectively. In this embodiment, as shown in FIG. 11, relating to the data word of FDF, the DSV control signal command (f) is output so that the DSV may diverge in the (−) direction, and hence it is required to control the code word so that the CDS may be (−) in the code string. Thus, in the MSB controller 4, by checking up the output (i') of the 1 symbol delay 4a which represents "0" or "1" when the level of the end of the code word after the NRZI modulation of a just preceding code word is low or high, respectively, it is checked by the EXOR circuit A whether or not the divergence directions of the CDS and the DSV are coincident with each other when the MSB of the code word to be output at present is "0". When the divergence directions of the CDS and the DSV are coincident or not coincident, the output of the EXOR circuit A is "0" or "1", respectively, thereby operating so that the CDS of the code word may be coincident with the divergence direction command of the DSV when the NRZI modulation of the MSB of the code word is carried out from the low level.

Then, the output of the EXOR circuit A and the output (i') of the 1 symbol delay 4a are fed to the EXOR circuit B. When the output (i') is "0" (that is, the end of the just preceding code word is ended as the low level after the NRZI modulation), the output of the EXOR circuit A is output as the MSB signal (Y) of the code word from the EXOR circuit B as it is. On the other hand, when the output (i') is "1" (that is, the end of the just preceding code word is ended as the high level), since the polarity of the CDS of the code word is inverted during the NRZI modulation, thus the output, of the EXOR circuit A is inverted in the EXOR circuit B, and the inverted output of the EXOR circuit A is output as the MSB signal (Y) of the code word from the EXOR circuit B.

By applying the above-described operation to one embodiment, as apparent from FIG. 11, when the data word of FDF is input to the encoder 3, the DSV control signal command (f), the CDS (g), the output of the EXOR circuit A, and the output (i') of the 1 symbol delay 4a are all "0", and the output of the EXOR circuit B is also "0" to output the MSB of the code word.

As described above, the 12 bits of data word are converted into 15 bits of code word according to a divergence direction command of a DSV. Further, as described above, it is necessary to check the level of the end of the code word after the NRZI modulation, and this checking is carried out as follows.

When the MSB of the code word is "0", the Q signal (h) and the MSB signal (Y) of the code word are input to the EXOR circuit C of the MSB controller 4. When the MSB of the code word is "0", the Q signal is output from the EXOR circuit C as it is. On the other hand, when the MSB of the code word is "1", since the code word is inverted during the NRZI modulation process, the Q signal is inverted in the EXOR circuit C, and the inverted Q signal is output from the EXOR circuit C. Then, the output of the EXOR circuit C and the output (i') of the 1 symbol delay 4a, which represents the level of the end of the just preceding code word after the NRZI modulation, are fed to the EXOR circuit D.

In the case where the output (i') is "0" (that is, the level of the end of the just preceding code word after the NRZI modulation is low), when the code word now being converted is continuous to the just preceding code word, the level of the end of the code word after the NRZI modulation becomes the output level of the EXOR circuit C. Hence, the output of the EXOR circuit C is output, as it is, from the EXOR circuit D to the 1 symbol delay 4a for use as an end level signal for the just following code conversion after the NRZI modulation of the just preceding code word. On the other hand, in the case where the output (i') is "1" (that is, the level of the end of the just preceding code word after the NRZI modulation is high), when the code word now being converted is continuous to the just preceding code word, it is necessary to convert the output of the EXOR circuit C, to that obtained when the level of the end of the code word after NRZI modulation starts from the high level. Hence, the output of the EXOR circuit C is inverted in the EXOR circuit D, and the inverted output is output from the EXOR circuit D to the 1 symbol delay 4a for use as the end level signal for the just following code conversion after the NRZI modulation of the just preceding code word.

By showing the aforementioned operation with one embodiment, when the data word of FDF is input to the encoder 3, the output (i'), the Q signal (h) of the encoder 3, the output (Y) of the EXOR circuit B, and the output of the EXOR circuit C are all "0". Further, the output (i') and the output of the EXOR circuit D become "0", which is coincident with the fact that the level of the end of the converted code word after the NRZI modulation is low.

The above-described operation is repeated every code word conversion, and the 1 symbol delay is carried out. Accordingly, the level check of the end of the code string in the continuous code word string can be correctly carried out.

Thus the obtained 15 bits of code word is input to the P/S converter 5 and is converted into a string of serial signal or serial code words therein, as shown in the form of a signal ((Y)+(j)) in FIG. 11. The obtained serial signal is fed to the NRZI modulator 6 which outputs an NRZI-modulated signal (k), as shown in FIG. 11.

Then, the data words of "000", "011", "015", "FFC", "003", "005", . . . are converted into code words shown as the signal ((Y)+(j)) in FIG. 11 while the DSV control is carried out by the DSV control signal command (f) in the same manner as described above, and then the NRZI modulation of the code words is carried out in the NRZI modulator 6 to output the signal (k). The DSV value of the end of each code word in the output signal (k) is within a variation width of ±1 at a 4 code word cycle, as shown in FIG. 11(1), and thus the code words can be obtained as signals synchronizing with the DSV control signal command.

In this embodiment, although the code word (j) composed of the LSB to the 14th bit of the 16 bits of the converted code in the code conversion table shown in FIGS. 10a to 10d is output by the encoder 3 and the MSB is decided by the MSB controller 4 to carry out the data conversion from the 12 bits of data word into the 15 bits of code word, two groups of 15 bits of code words composed of a pair of ±code words groups can be prepared, and one of the groups can be selected by the DSV control signal command (f) and the level signal of the end of the just preceding code word after the NRZI modulation so as to directly output 15 bits of code word.

Further, in this embodiment, although an example where the code word is further NRZI-modulated is output has been described, after the P/S conversion of the code word, the obtained string of serial code word can be output as it is. In this instance, by using only code words whose run-length codes satisfies at least 2 (3) continuous bits of the same level in the MSB side, at least 3 (2) continuous bits of the same level in the LSB side and at least 5 continuous bits of the same level within the code word itself and the CDS value is either +1 or −1 obtained at "1" or "0" level, respectively, each pair of code words having different polarities of the CDS are allowed to correspond to one data word, and one of each pair of code words is selected according to the DSV control signal command (f) with the same effects as the above-described embodiment.

As described above, according to the present invention, the number of the same level of continuous codes within the code word after the NRZI modulation is at least 5, and the coding is carried out by using only the code words with the CDS of ±1 while the CDS value is controlled so as to suppress the divergence of the DSV according to the DSV control signal command. Hence, a data conversion system having a large suppression effect against a relatively low frequency range can be achieved compared with a conventional data conversion system.

According to the present invention, by allowing a pair of code words having CDSs of ±1 to correspond to one data word, a DSV control can be freely carried out every code word unit, and hence suppression of a relatively low frequency range can be realized.

Figure 12:
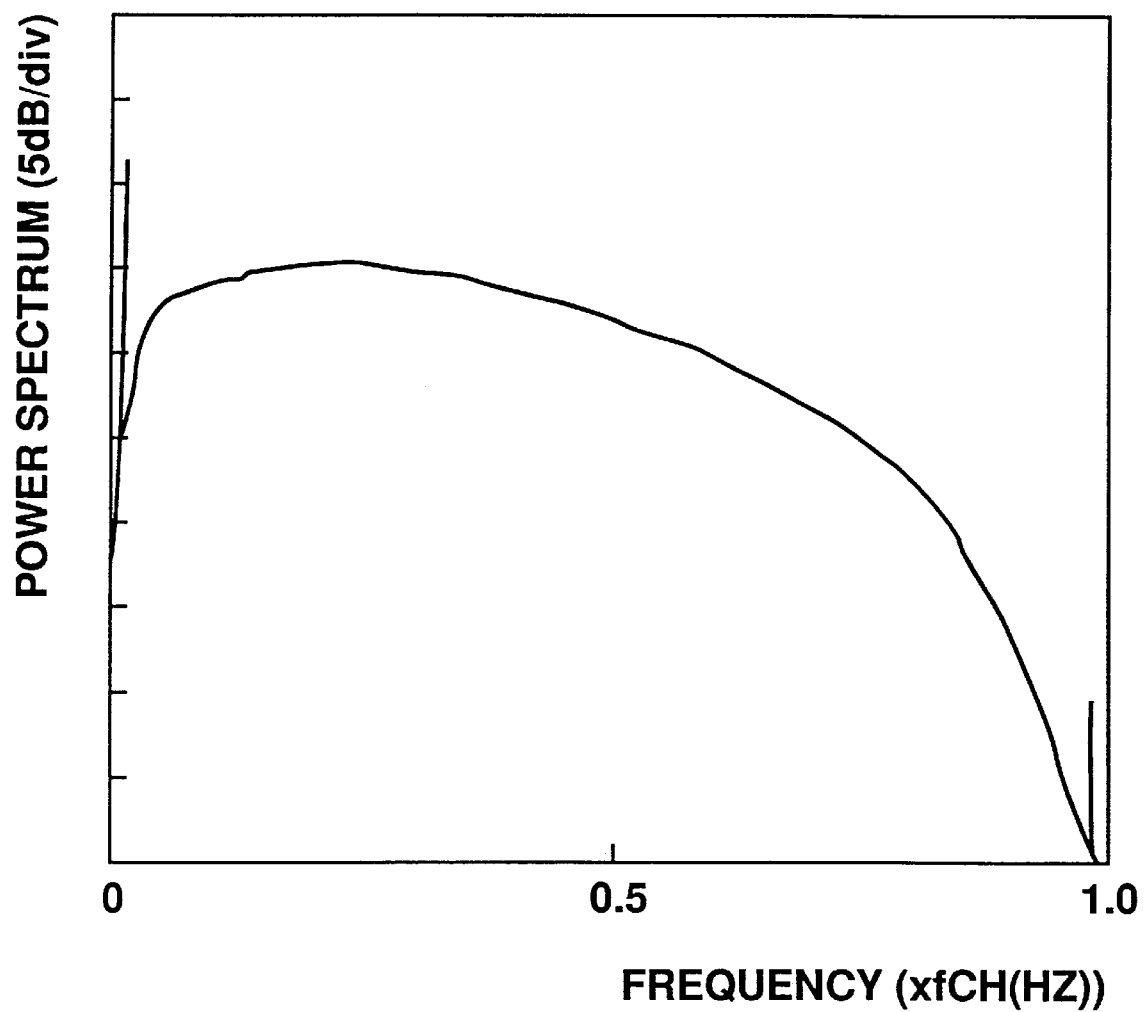
FIG. 12 is a graphical representation showing a power frequency spectrum of a signal obtained in the data conversion system according to the present invention.
Figure 13:
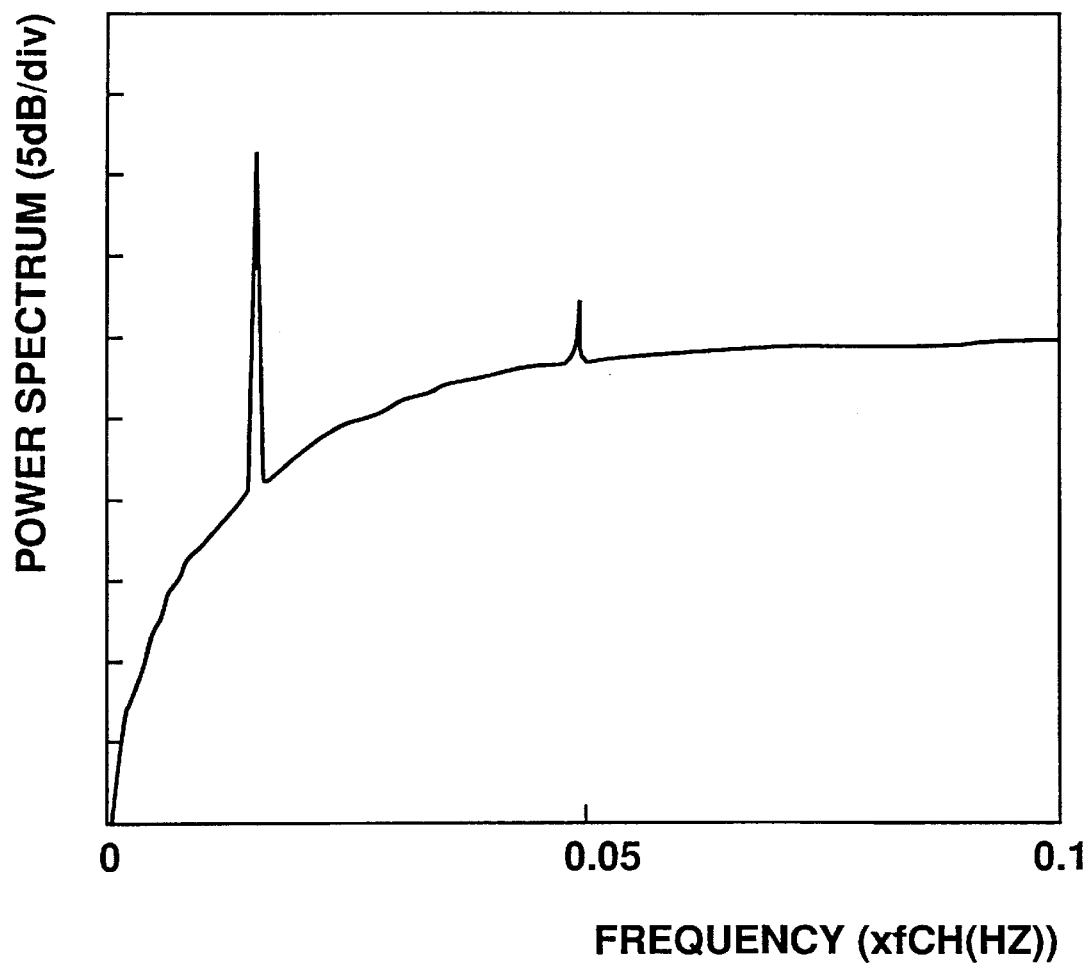
FIG. 13 is a graphical representation showing another power frequency spectrum of a signal obtained in the data conversion system according to the present invention.

FIGS. 12 and 13 show power spectra obtained according to the present invention. That is, a circuit is constructed by one embodiment of a data conversion system of the present invention, and random signals of M series represented by a formula of $(X^{23}+X^5+1)$ are partitioned every 12 bits and are input to the circuit to obtain the power spectra. FIG. 12 shows a spectrum extending from 0 to a frequency of a signal for carrying NRZI modulation data. In this case, frequency components less than 0.05×fcH (carrier frequency) are suddenly damped to accomplish a DC free modulation. FIG. 13 shows a spectrum extending from 0 Hz to a frequency of 0.1×fcH. In this case, the DC free modulation is achieved, and it is apparent that a strong spectrum only in the frequencies of the DSV control signal command cycle can be obtained.

Further, the signals of the DSV control signal command cycle can be extracted by a band pass filter, and hence the signals can be used as the second signal synchronizing with the digital signal. For instance, when the present invention is applied as a data converter to a magnetic recording and reproducing apparatus in which digital signals are recorded or reproduced onto or from a magnetic tape by using a rotary drum, such signals can be used as pilot signals for a head to correctly scan along recording tracks in the reproducing mode.

Next, one embodiment of a pilot signal formation circuit for realizing a pilot signal formation system according to the present invention will now be described in detail in connection with FIGS. 14 to 23. In this case, data conversion is carried out in the same manner as described above with reference to FIGS. 8 to 13.

Figure 14:
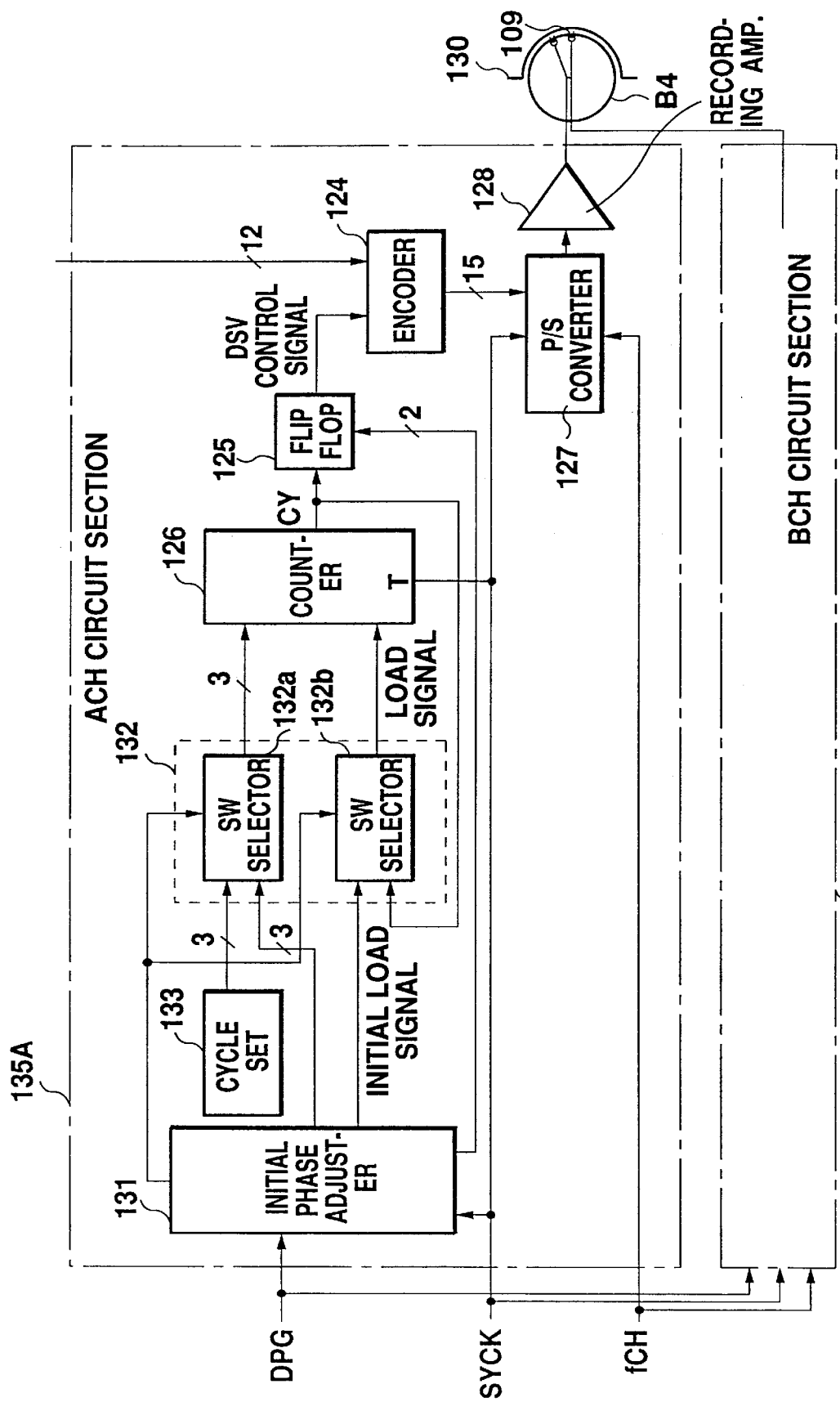
FIG. 14 is a block diagram of one embodiment of a pilot signal formation circuit for forming a tracking error in a magnetic recording and reproducing apparatus according to the present invention.

As shown in FIG. 14, an encoder 124 having a code conversion table shown in FIG. 15 carries out data conversion from 12 bits of parallel input digital signal or data word into a 15 bit parallel digital signal or code word, charge storage (CDS) within the code word allowing a pair of code words having different polarities of −1 and +1 to correspond to one input digital signal. A flip flop 125 outputs a DSV control signal for setting the CDS value of the code word output from the encoder 124. A counter 126 for counting up a code conversion cycle (SYCK) is provided with a load terminal for input of a preset count value, a set input terminal of 3 bits and a CY output terminal for outputting a 1 level to the flip flop 125 when the count value is 7.

A parallel-serial (P/S) converter 127 converts the 15 bits of parallel code word fed from the encoder 124 into a string of serial code words to be transferred at a serial data transfer frequency (fcH). A recording amplifier 128 capable of supplying a certain current even on a low load receives the serial code word from the P/S converter 127 and outputs an amplified signal to a double azimuth magnetic head 129 arranged on a rotary drum 134. The double azimuth head 129 includes two heads A and B having different azimuth angles. A recording medium 130 such as a magnetic tape is wound around approximately half the rotary drum 134.

An initial phase adjuster circuit 131 synchronized with the rotation of the rotary drum 134 receives a drum PG (DPG) signal, generated by a sensor (not shown) mounted to the rotary drum 134, for generating one pulse per one rotation of the rotary drum 134 and the SYCK and sets an initial phase of a pilot signal at a recording start point every one rotation of the rotary drum 134. A selector 132 selectively outputs signals to the set input terminal and the load terminal of the counter 126. A cycle set 133 for setting the cycle of the counter 126 outputs 3 bits of signal to one terminal of the selector 132. The above-described components, except the double azimuth head 129 and the rotary drum 134, constitute an A-channel (Ach) circuit section 135A. A B-channel (Bch) circuit section 135B having the same structure as the A-channel circuit section 135A (and thus its detailed description is omitted for brevity) is also provided.

In this embodiment, although the data word length m and the code word length n (n>m) are selected to 12 and 15, respectively, the present invention is not restricted to these values, and any numbers can, of course, be used within the scope of the present invention.

The operation of the system shown in FIG. 14 will now be described in detail in connection with FIGS. 14 to 23.

Figure 16:
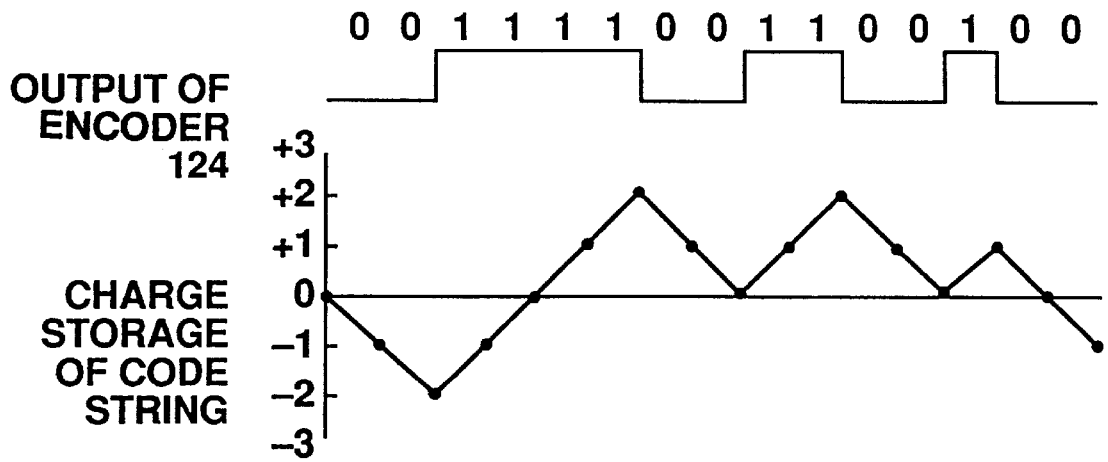
FIGS. 16 and 17 are timing charts of a DSV value of a code word according to the present invention.

In FIG. 14, 12 bits of digital signal are input to the encoder 124 and converted therein into 15 bits of code word selected from one of a pair of code word groups corresponding to a pair of CDSs of ±1 in a code conversion table shown in FIG. 15 according to the DSV control signal output from the flip flop 125. The obtained code word is output from the encoder 124 to the P/S converter 127. FIG. 16 shows, for example, 15 bits of code word obtained from an input digital signal of 001 (hereinafter indicated in the same manner as a parallel signal such as 012, . . . EF) according to the code conversion table shown in FIG. 15, output from the encoder 124, and also shows the charge storage of a string of the code word output from the encoder 124 when the DSV control signal is 0 level. It is clear from FIG. 16 that the charge storage or the level of the end of the code word is –1.

Figure 17:
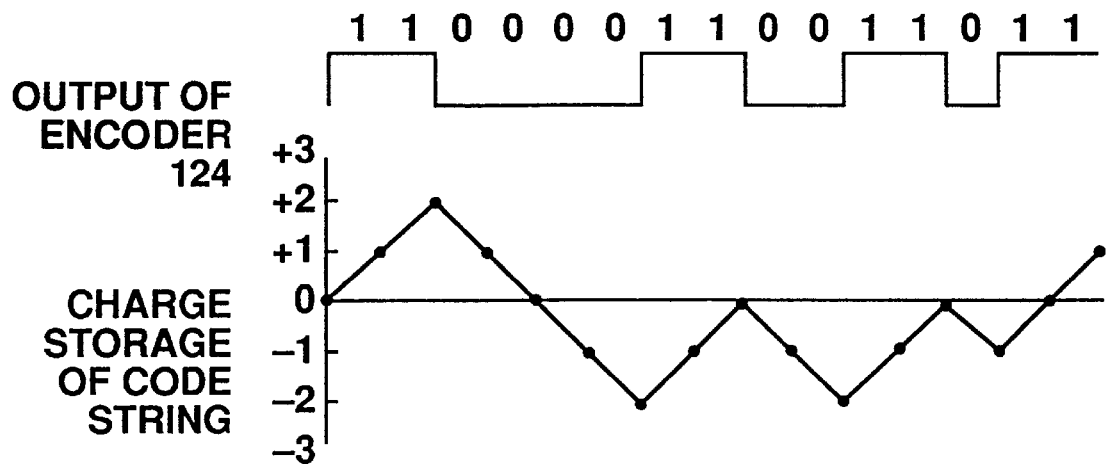
Figure 18:
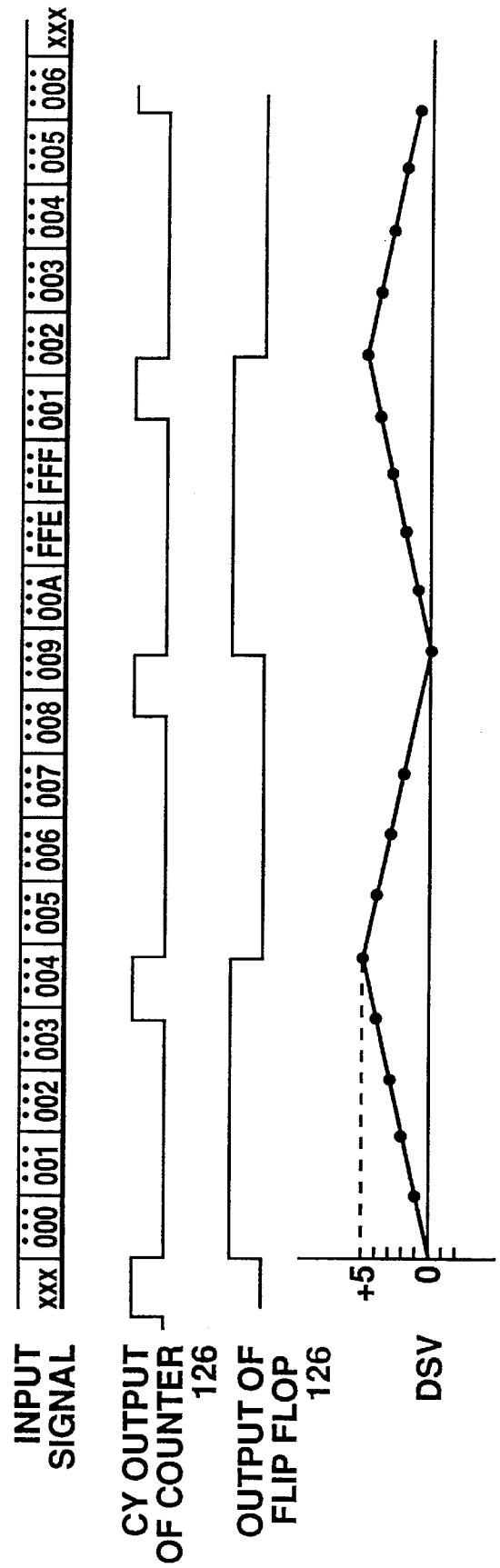
FIG. 18 is a schematic chart for explaining an operation of the circuit shown in FIG. 14.

FIG. 17 shows another 15 bits of code word obtained from an input digital signal of 001 output from the encoder 124 when the DSV control signal is 1 level, and also shows the charge storage of a string of the code word. It is readily understood that the level of the end of the code word is +1. The charge storage or CDS within the code word is either –1 or +1 for all code words, as shown in FIG. 15, and the CDS at the end of the code word is properly controlled to –1 or +1 by the output level or the DSV control signal output from the flip flop 125. Hence, for example, as shown in a timing chart in FIG. 18, the counter preset value of the counter 126 which counts up to every SYCK, is set to 3, and the CY output of the counter 126 to which the preset value is repeatedly loaded by the CY output at the count value of 7, is fed to the flip flop 125. The flip flop 125 divides the CY output frequency to ½, and by controlling the CDS by the ½ frequency-divided signal, the code string having a cycle of ten times as large as the SYCK and the DSV=5 at the end can be obtained in the encoder 124.

The power spectrum of the digital signal having two-values such as 1 and 0 can be decided by the appearance of a state transition probability diagram. For example, in the case of the random digital signal in M system, the power spectrum is approximately flat in the frequency range from DC to a carrier clock signal frequency. On the other hand, like the present invention, in the code string where the DSV is regularly and correctly varied at a fixed cycle, in cooperation with the limited DSV, a signal having no DC component and having a spectrum resistant to DSV frequency can be obtained.

Figure 19:
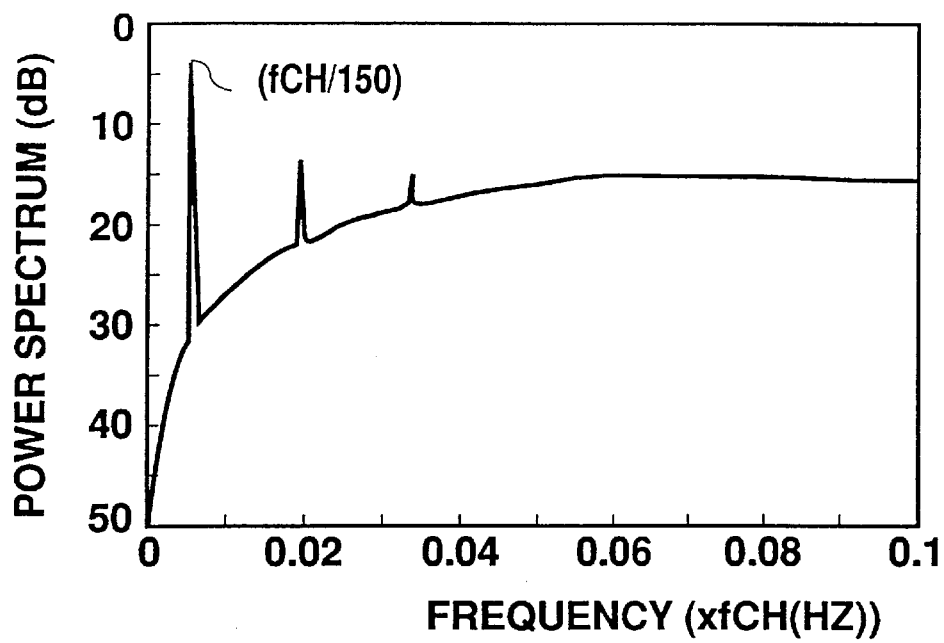
FIG. 19 is a graphical representation showing a power frequency spectrum of a code string obtained in the circuit shown in FIG. 14.

FIG. 19 shows a power spectrum obtained as follows. That is, under the conditions where the CDS control cycle of the code word is ten times as much as the code conversion cycle, 15 bits of parallel digital signal output from the encoder 124 are fed to the P/S converter 127 and are converted therein into serial data, and the obtained-serial data are transferred at ⅟₁₅ of the code conversion cycle to the magnetic head 129 through the recording amplifier 128. The power spectrum flowed in the magnetic head 129 is measured, as shown in FIG. 19, and it is confirmed that the spectrum resistant to the DSV cycle (⅟₁₅₀ of the series data carrier frequency fcH) can be obtained. Accordingly, by recording such a signal onto the magnetic tape 130, a low frequency pilot signal can be recorded in synchronization with a digital signal in the same manner as a conventional method.

Next, a method of recording a pilot signal formed by the present system will now be described in detail with reference to FIGS. 20 and 21.

Figure 20:
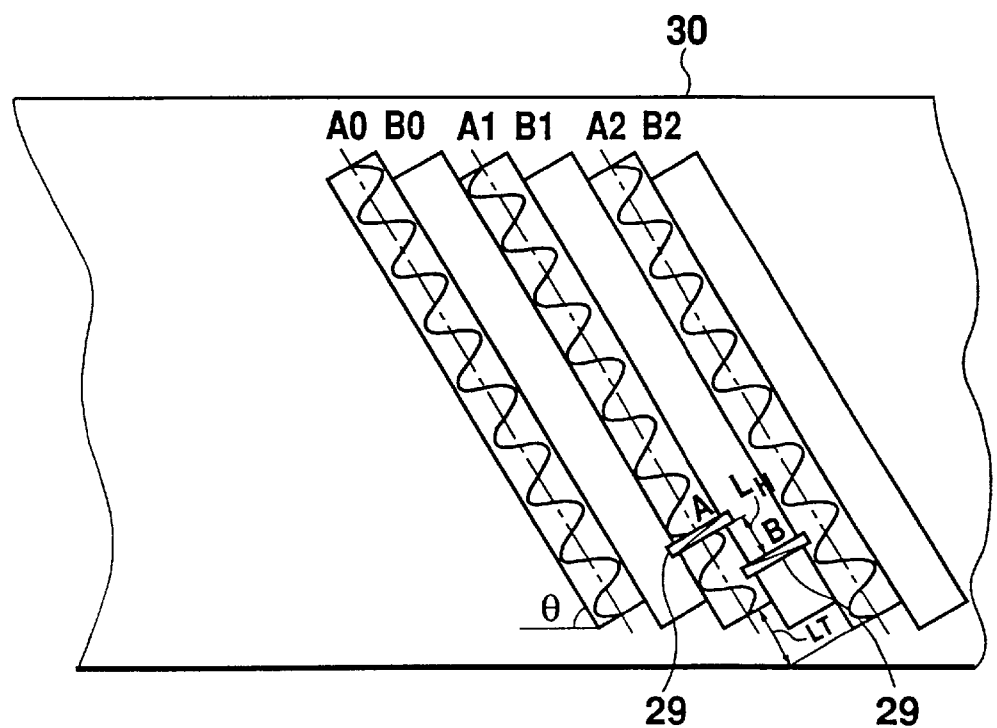
FIG. 20 shows recording tracks and magnetic heads for recording the tracks in the circuit shown in FIG. 14.
Figure 21:
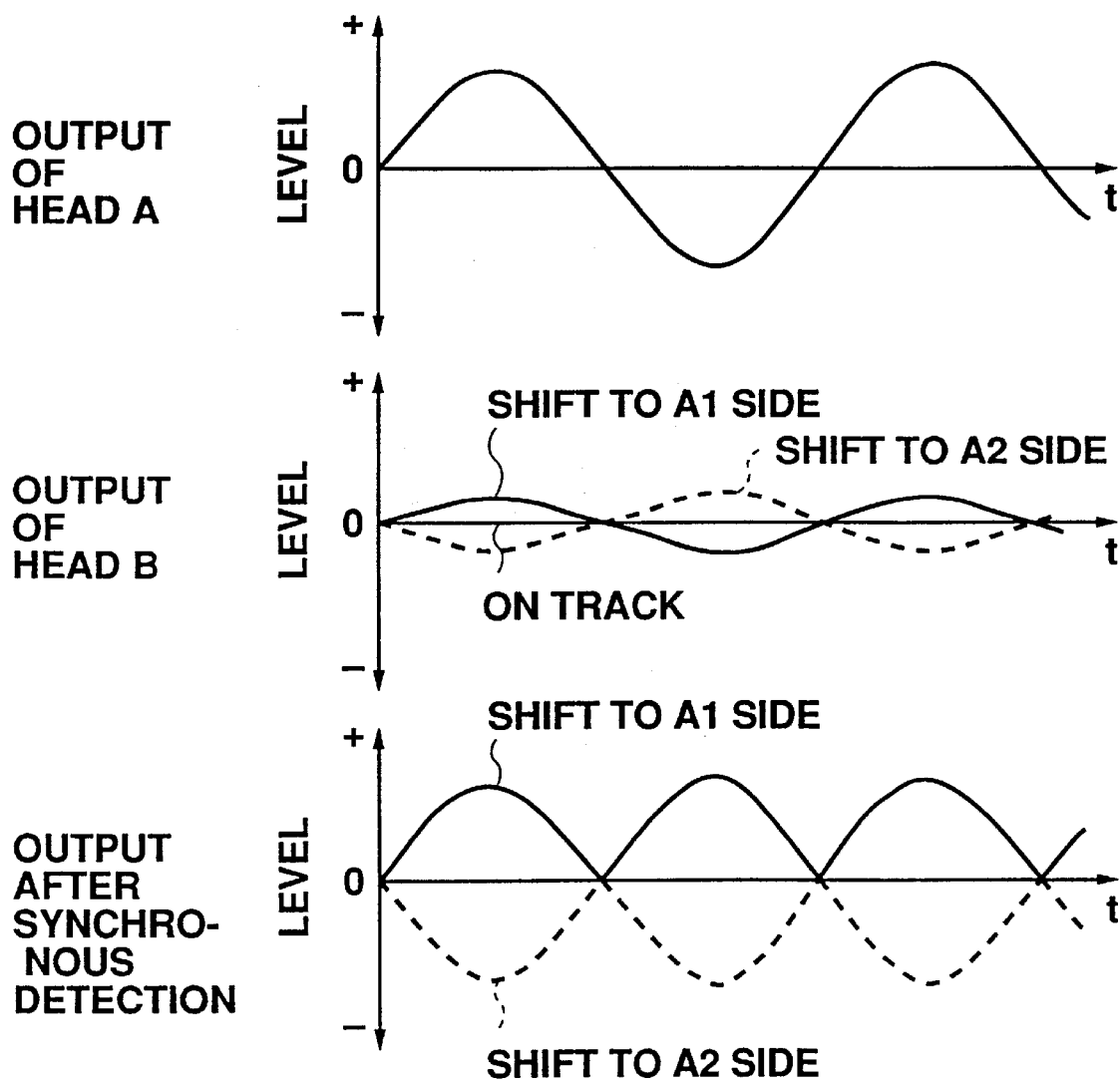
FIG. 21 is a timing chart showing an error signal formation from pilot signals according to the present invention.

In FIG. 20, on A channel tracks A0, A1 and A2, a first signal output from the recording amplifier 128 to the double azimuth magnetic head 129 composed of two heads A and B is recorded by the head A, and on B channel tracks B0, B1 and B2, a second signal having a different DSV cycle from that of the first signal, coded in the same manner as described above, is recorded by the head B. In this case, the distance L between the two heads A and 13 is 400 to 1000 μm, and the head A precedes a distance an integral number of times as much as the pilot wavelength from the head B.

In this embodiment, what is noteworthy is a 180° shift between the phases of the pilot signals of two tracks A1 and A2 On both sides of the track B₁, so head 13 detects the error signal in order to carry out a tracking control in the reproducing mode. In recording such pilot signals, as shown in FIG. 21, when the head 13 is on-track in the center of the track B₁, the pilot signals picked up by the head B from the two tracks A1 and A2 adjacent to the track B1 as the head B scans are zero, and, when the head B is off-track in the direction of the track A1, the phase is the same as that of the pilot signals picked up by the preceding head A, or when the head B is off-track in the direction of the track A2, the phase is reverse to that of the pilot signals picked up by the head A. Therefore, by carrying out a synchronous detection of the pilot signals picked up by the head B by using the pilot signals picked up by the head A, when the head B is on-track, zero is obtained, and when the head B is off-track in the direction of either track A1 or A2, either (+) or (–) tracking error signals can be formed. Hence, by using the thus obtained tracking error signal, the tracking control in the reproducing mode is possible in the same manner as a conventional method.

In the present system, as described above, by recording the pilot signals on every other track so that the phases of the pilot signals may be inverted through 180° every recording of the pilot signal on the track, as shown in FIG. 20, when the head is on-track, the crosstalk of the pilot signals disappears, and hence the disturbance on reproducing the digital signal is removed.

Then, the obtained pilot signals are recorded under the above conditions as follows. As shown in FIG. 20, for example, assuming that a track slant angle is θ and a track pitch is TP, the head B picks up signals having a track step difference LT=(2TP/tanθ) between the recording start points of the two tracks A1 and A2 adjacent to the track B1 the head B now scans and picks up the pilot signals from the two tracks A1 and A2. Accordingly, it is necessary to control the DSV phase so that the phase of the pilot signal of the track A2 may be reversed to the phase of the pilot signal of the track A1 at the point (2TP/tanθ) from the recording start point. On the other hand, assuming that the relative speed of a head with respect to a tape is Vh, a wavelength λ(PILOT) of a pilot signal is exhibited as λ(PILOT)=(Vh/DSV) cycle, the resolution of phase control becomes (360°/DSV) cycle coded block number X. In this case, the DSV cycle is, of course, the same as the aforementioned CDS control cycle.

Therefore, in order to settle the phase difference of 180° between the pilot signals of the tracks A1 and A2 with reference to the head B, the phase difference Δφ1 between the pilot signals due to the track step difference LT is obtained under the condition of LT>λ(PILOT)·P (P: integer) as follows.

$$\Delta\phi 1=(LT-\lambda \cdot P/\lambda)\cdot 360°$$

Then, the phase control amount Δφ2 for achieving the phase difference of 180° is calculated as follows.

$$\Delta\phi 2=\Delta\phi 1-180°$$

On the other hand, in the present system, the resolving power of the phase control of the pilot signal is 360°/DSV) cycle coded block number X, as described above, and it is enough to shift the phase of the DSV control signal for a value of Y of which |Δφ2−(360/X)·Y| becomes the minimum. In this instance, Y is an integer satisfying Y≦(X/2).

Figure 22:
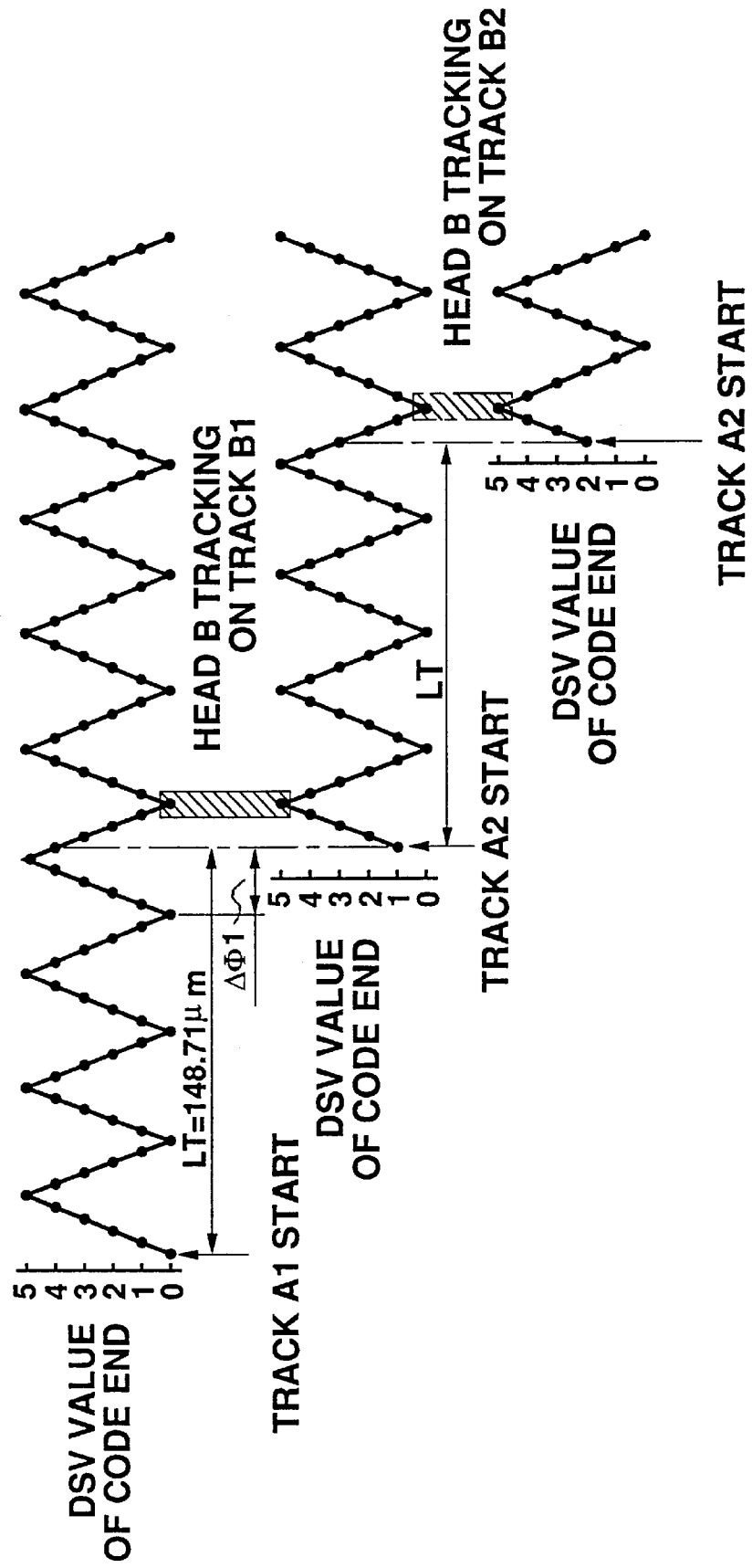
FIG. 22 shows a relationship among phases of pilot signals of adjacent tracks according to the present invention.

Next, the operation of the phase control will be described more specifically in connection with FIG. 22 in which specific values are substituted for parameters for better understanding. Now, with the comparative speed Vh=9.4 m/sec, the coding frequency=2.28 MHz and the DSV cycle =10 coded block, the DSV frequency, i.e., the pilot frequency becomes 2,74 MHz/10=228 KHz, and the wavelength of the pilot signal λ(PILOT)=9.4/(228×$10^3$)=41.23 µm. Further, with the track pitch TP=6.1 µm and the track slant angle θ=4.69°, the track step difference LT between the tracks A1 and A2 becomes 2.61 µm/tan4.69°=148.71 µm.

Hence, according to the above formulas, the phase difference Δφ1 is calculated to obtain 218.46°, and the phase control amount Δφ2 is 218.46°−180°=38.46. On the other hand, the phase control resolution of the DSV control is (360°/10) block=36°, and Y of which |Δφ2−(360/X) ·|the minimum is 1.

Accordingly, when the DSV initial phase signal of the pilot signal starts from 0 at the start of the recording of the track A1, by starting from 1 in the track A2, the pilot signals of the tracks A1 and A2 with the 180° phase difference therebetween with reference to the head B can be recorded. Then, for the track A3 to the track An, the recording of the pilot signals can be carried out by starting from a number which is obtained by adding +1 to the DSV initial phase signal value of the preceding track in the same manner as described above.

Figure 23:
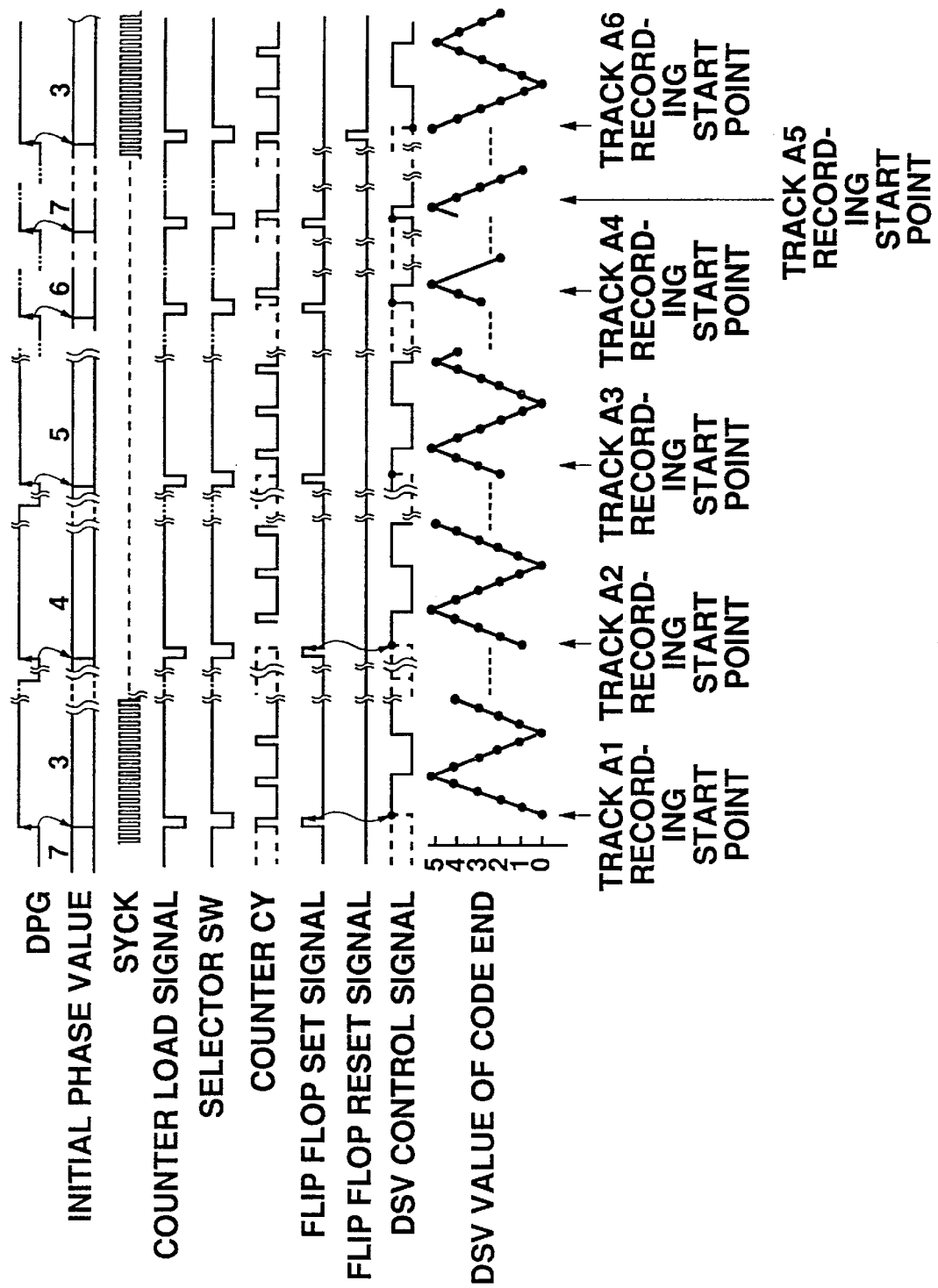
FIG. 23 is a time chart showing wave forms appearing in the circuit shown in FIG. 14.

Hence, as a specific circuit operation, as is apparent from FIG. 23, by counting up a counter in the initial phase adjuster circuit 131 with Y=Y+1 by the DPG pulse signal generated every one rotation of the rotary drum in synchronization with the rotation of the rotary drum, the selector 132 is switched to preset the initial phase value in the counter 126 just before the recording start. For instance, when the track A1 is recorded, 3 of 0+3 (3 is an offset value for outputting CY from the counter 126 at the count value of 7) is output from the initial phase adjuster circuit 131 to the counter 126, and, when the track A2 is recorded, 4 is output from the initial phase adjuster circuit 131 to the counter 126. Then, the counter within the initial phase adjuster circuit 131 is counted up by Y in every X/2 base every one rotation of the rotary drum in the same manner as described above. Further, every carry signal in the counting, it is required to set and reset the flip flop 125 for deciding the initial polarity of the DSV by the initial polarity set signal.

After the initial phase value is loaded to the counter 126, the counter 126 is counted up by the SYCK of the code conversion rate and outputs the signal CY at the count value of 7. The signal CY is input to the flip flop 125, and the DSV control signal is inverted from 0 to 1 or from 1 to 0 by the trailing edge of the signal CY. Also, after the initial phase value is loaded into the counter 126, the selector 132 is switched together with the cycle set 133 for deciding the DSC phase so that the the signal CY made be input to the counter 126. Hence, by inputting the cycle set value by the signal CY, the counter 126 is configured as a ring counter (of 8-cycle set value) and outputs the signal CY every time the count value of 7 is reached.

Accordingly, the initial phase value is decided by the initial phase adjuster circuit 131, and then the DSV control signal repeatedly inverted by the trailing edge of the signal CY is provided with a cycle of (8-cycle set value)×2 coded block number with a 50% duty cycle. Thus, by controlling the CDS of the code word output from the encoder 124 by using the obtained DSV control signal, the DSV phase with respect to the track position can be controlled at will, and the pilot signals having a 180° phase difference can be recorded every other track so that phases of the pilot signals may be inverted through 180° every recording of the pilot signal on the track, as shown in FIG. 20.

Figure 4:
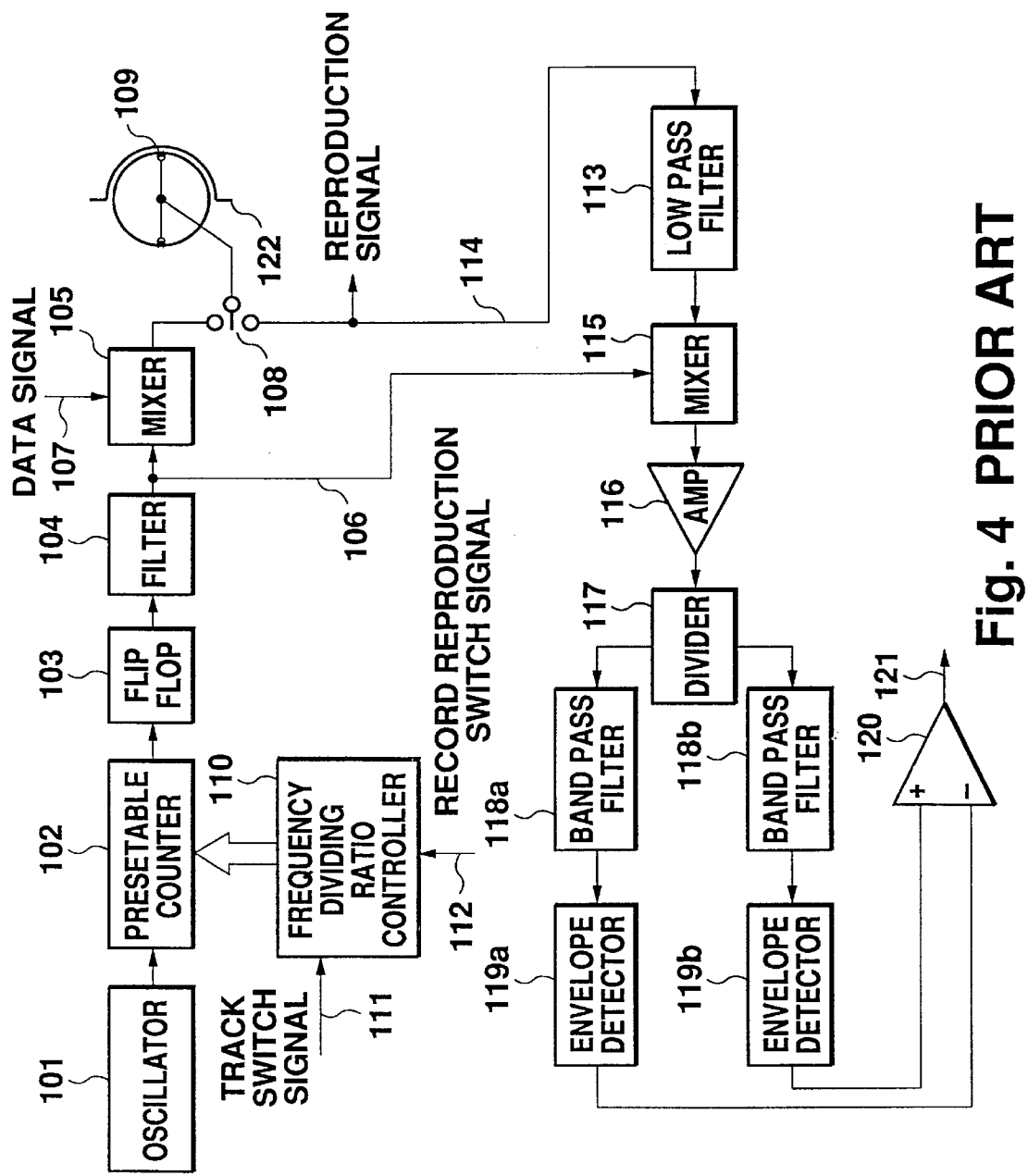
FIG. 4 is a schematic block diagram of a pilot signal formation circuit and tracking error detection circuit for forming a tracking error in a conventional magnetic recording and reproducing apparatus.
Figure 5:
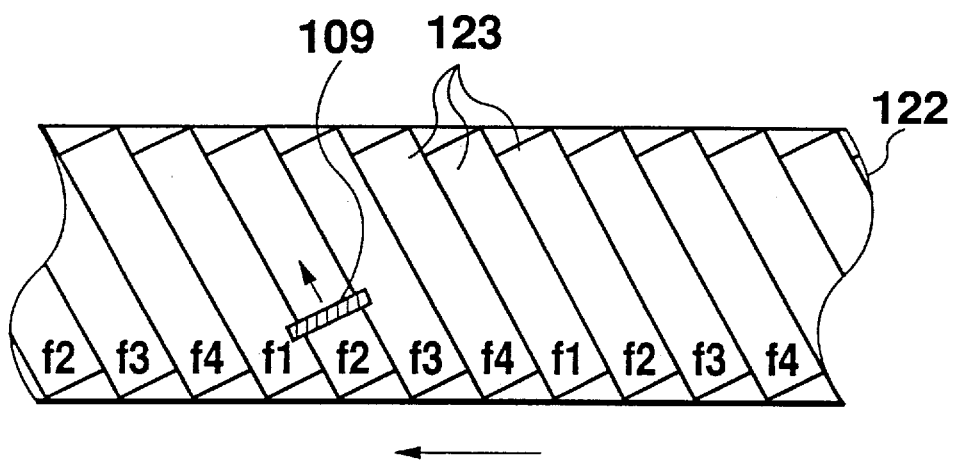
FIG. 5 shows a relationship between a recording medium and a magnetic head movable thereon for use in the conventional system shown in FIG. 4.
Figure 6:
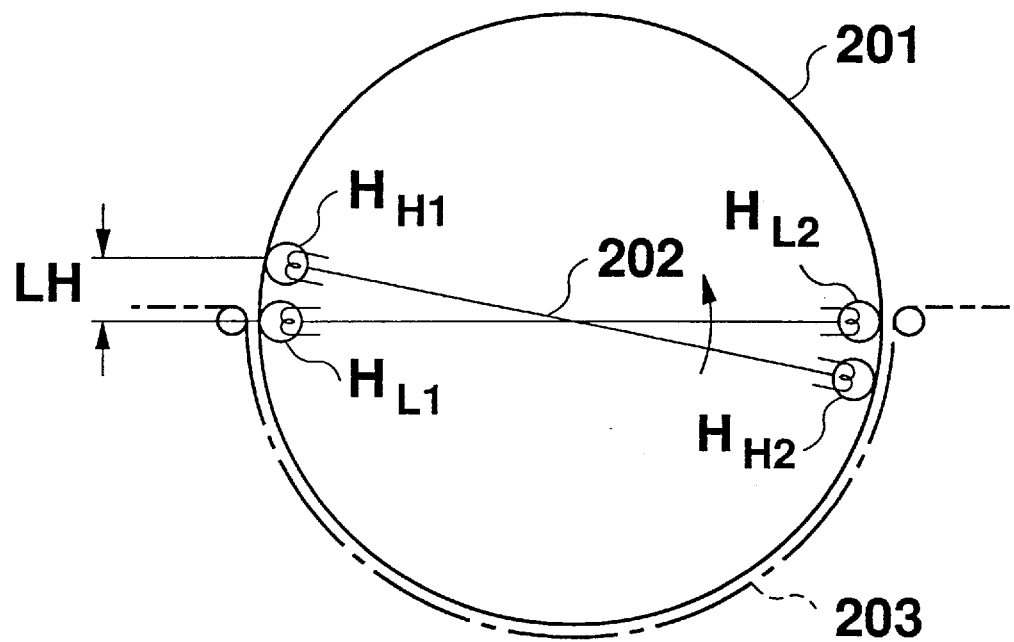
FIG. 6 shows a conventional rotary magnetic head device arranged on a rotary drum.
Figure 7:
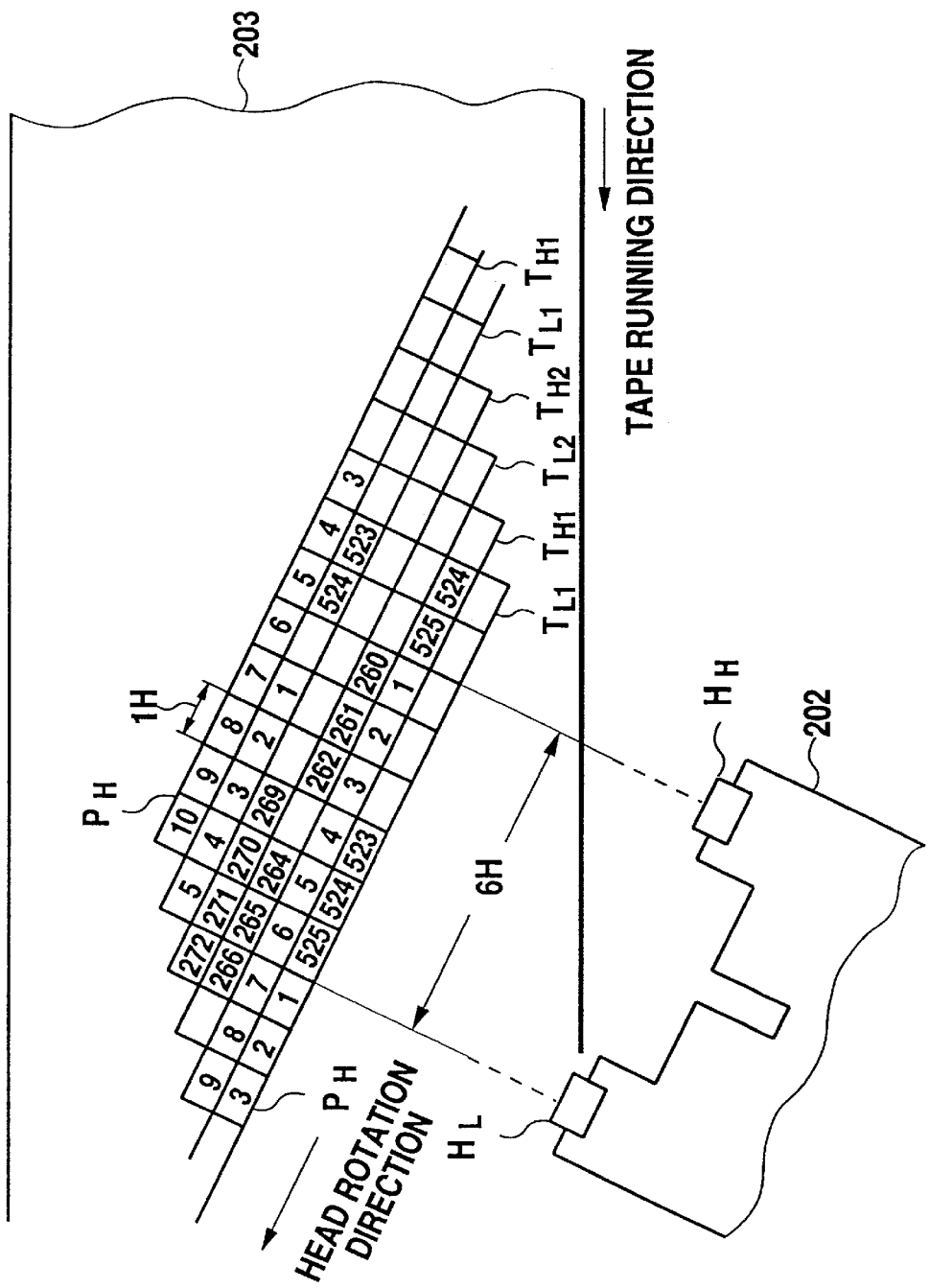
FIG. 7 shows a relationship between a recording track pattern recorded on a recording medium and the rotary magnetic head device shown in FIG. 6.
Figure 24:
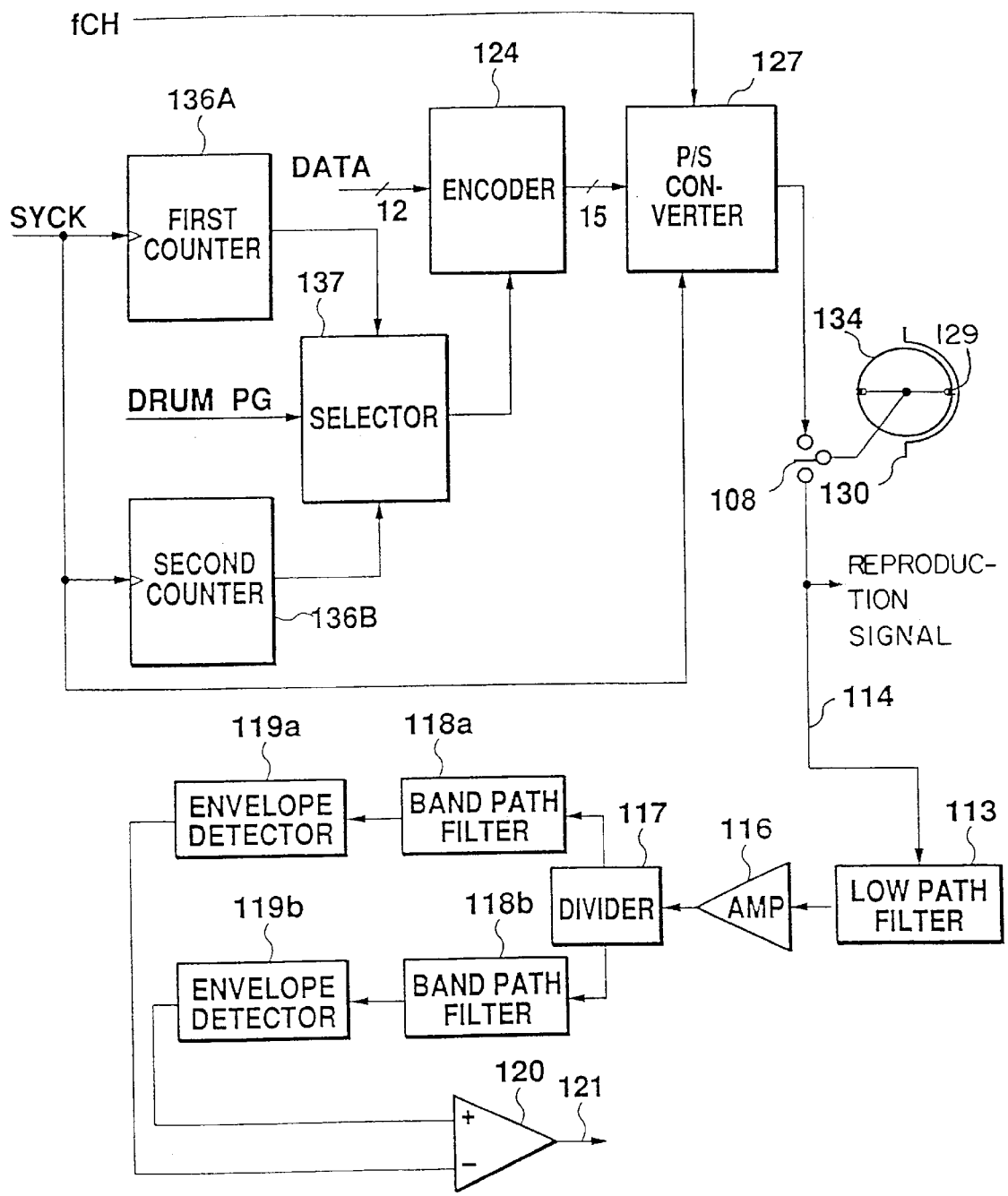
FIG. 24 is a block diagram of another embodiment of a pilot signal formation circuit and a tracking error detection circuit for forming a tracking error in a magnetic recording and reproducing apparatus according to the present invention.

In FIG. 24, there is shown another embodiment of a pilot signal formation circuit and a tracking error detecting circuit for use in producing a tracking error according to the present invention. In this embodiment, an encoder 124, a P/S converter 127, a magnetic head 129, a recording medium 130 and a rotary drum 134 are the same as those shown in FIG. 14 and the explanation of the same is omitted for brevity. Further, a turnover switch 108, a low pass filter 113, an amplifier 116, a divider circuit 117, a pair of band pass filters 118a and 118b, a pair of envelope detector circuits 119a and 119b and a differential amplifier 120 are the same as those shown in FIG. 4 and the explanation of the same is omitted for brevity.

As shown in FIG. 24, a pair of first and second counters 136A and 13613 count; up the SYCK and output respective first and second DSV clock signals having different frequencies such as one by an even number of the SYCK and a duty ratio of 50%. A selector 137 selects one of the first and second DSV clock signals output from the first and second counters 136A and 136B according to the drum PG signal.

The operation of the system shown in FIG. 24 will now be described in detail in connection with FIGS. 15, 19, 24, 25 and 26.

In the recording mode, the first counter 136A counts up the SYCK and outputs the first I)SV control signal, and the second counter 136B also outputs the second DSV control signal having a different frequency from that of the first DSV control signal in the same manner as the first counter 136A. Then, the selector 137 selects one of the first and second DSV control signals according to the drum signal and outputs the selected I)SV control signal to the encoder 124. In the encoder 124, in accordance with the first or second DSV control signal output from the selector 137, 12 bits of parallel input digital signal are converted into 15 bits of parallel code word selected from one of a pair of code word groups corresponding to the CDS of ±1, as shown in FIG. 15.

Figure 25:
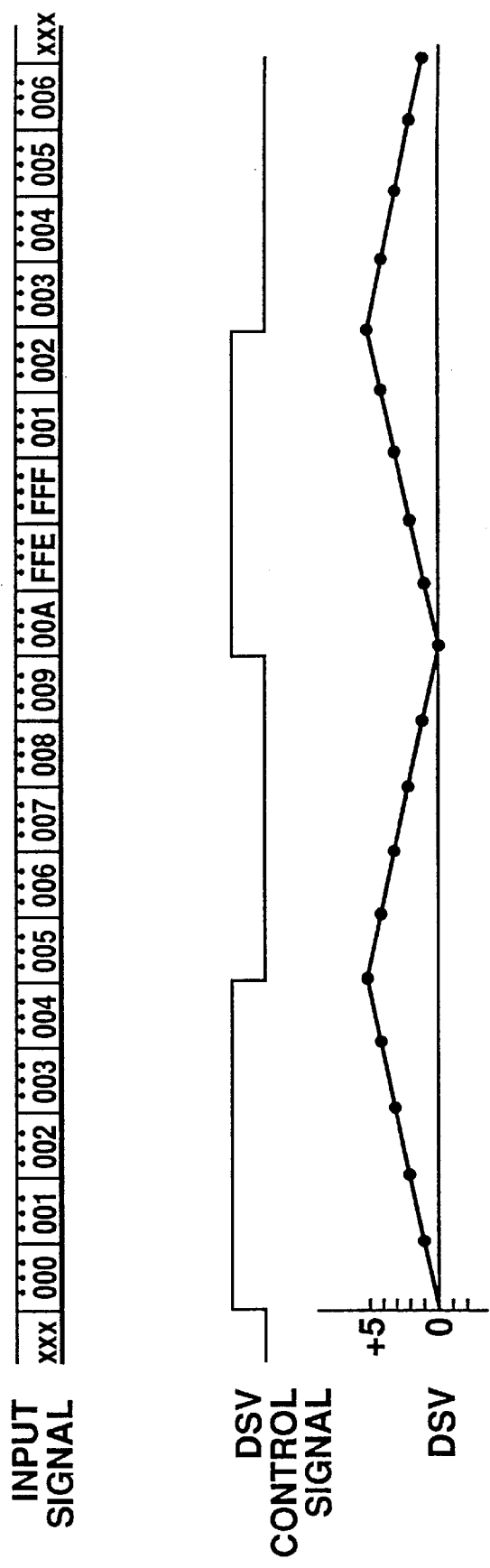
FIG. 25 is a schematic chart for explaining an operation of the circuit shown in FIG. 24.

By controlling the DVS of the code word, a code word string having a cycle of 2i (i=integer) times as much as the code conversion cycle and the DSV=i at the end of the code word can.be obtained. The obtained 15 bits of parallel code word are fed to the P/S converter 127 and converted therein into serial data by a clock fcH having one fifteenth the cycle of the SYCK, and the serial data is sent to the magnetic head 129 through the switch 108 and a recording amplifier (not shown). The magnetic head 129 records the serial data on the magnetic tape 130. FIG. 25 shows the input signal, the DSV control signal and the DSV of the recorded code word when the cycle of the DSV control signal is one tenth of the SYCK, and the DSV of the code word necessarily becomes 0 every ten symbols. That is, the pilot signal having a frequency of one tenth of the SYCK can be recorded.

Figure 26:
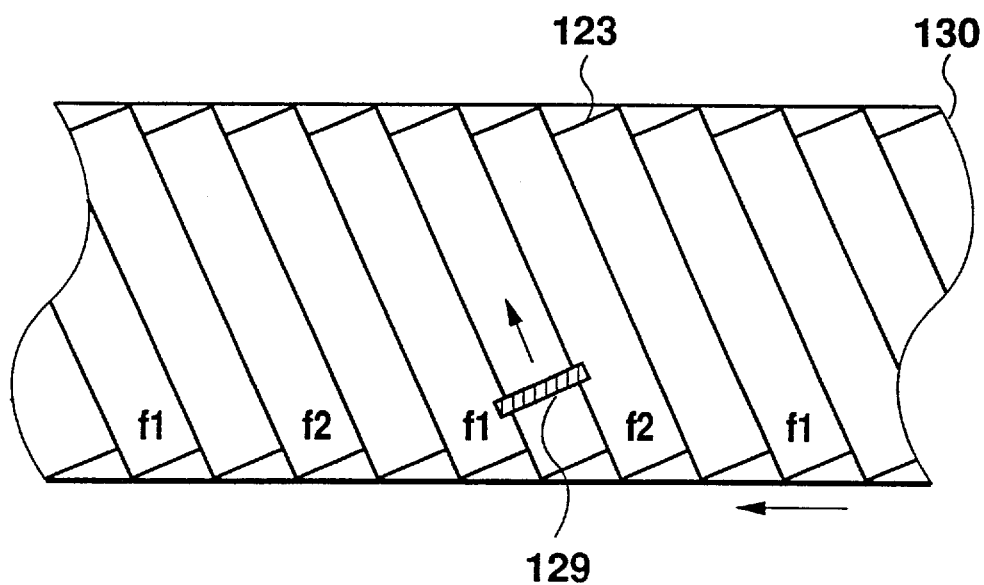
FIG. 26 shows a relationship between a recording medium and a magnetic head movable thereon for use in the circuit shown in FIG. 24.

The power spectrum of the digital signal having two-value such as 1 and 0 can be decided by the appearance of a state transition probability graph. For example, in case of the random digital signal in M system, the power spectrum is approximately flat in a frequency range from DC to a carrier clock signal frequency. On the other hand, like the present invention, in the code string in which the DSV is regularly and correctly varied at a fixed cycle, in cooperation with the limited DSV, a signal having no DC component and having a spectrum resistant to DSV frequency can be obtained. FIG. 10 shows a power spectrum of the output of the P/S converter 127, that is, the recording signal obtained under the condition that the CDS control cycle of the code word is ten times as much as the code conversion cycle, and it is confirmed that the spectrum resistant to the DSV cycle ($\frac{1}{150}$ of the series data carrier frequency fcH) can be obtained. Accordingly, by recording such a signal onto the magnetic tape 130, a Low frequency pilot signal can be recorded in synchronization with a digital signal in the same manner as a conventional method. FIG. 26 shows the relationship between the recording tracks 123 recorded on the magnetic tape 130 as described above and the magnetic head 129. In FIG. 26, f1 is the frequency of the pilot signal settled by the first counter 136A and f2 is the frequency of the pilot signal settled by the second counter 136B. The two frequencies f1 and f2 are different from each other.

Next, in the reproducing mode, when the recording signal is reproduced from the magnetic tape 130 by the magnetic head 129, the data signal including the pilot signals is reproduced. Since the frequency of the pilot signals is very low compared with the data signal, even in an azimuth recording, the azimuth effect hardly appears, and the pilot signals of both the adjacent tracks are picked up as crosstalk. Hence, the data signal is reproduced by using one of the pair of magnetic heads 129 which records no pilot signal, and the two pilot signals are extracted by using the band pass filters 118a and 118b. Then, the extracted pilot signals are detected in the respective envelope detector circuits 119a and 119b, and the detected signals are compared in the differential amplifier 120. When the tracking is shifted to the f1 side or f2 side, a negative or positive signal as a tracking control signal 121, is output from the differential amplifier 120. In this case, the central frequencies of the band pass filters 118a and 118b are f1 and f2, respectively.

As described above, according to the present invention, the pilot signals required for the tracking control can be formed by the DSV of the digital signal, and the phase of the DSV can be controlled at will. Hence, the pilot signals having a high accuracy can be obtained without causing any disturbance of the digital signal, and the whole system is carried out using digital signal processing, enabling a reduction in the cost.

Further, since the pilot signal is formed and recorded as a part of the recording data signal in the modulation, the waveform deformation is small in the digital demodulation, and the large S/N ratio of the servo detection signal can be obtained. Further, the tracking pitch can be narrowed to achieve high density recording and reproducing. Further, since the pilot signals are formed in the modulation at the same time, a pilot signal generator and a mixer are not required in the recording, thus simplifying the system.

According to the present invention, by controlling the polarity of a CVS according to a DSV control signal by using only code words corresponding to the DSV of ±1, pilot signals of the DSV cycle are synchronized with digital data in a low frequency range where the power spectrum of the digital data is rapidly damped.

Further, by recording a digitally-modulated signal including pilot signals having two different frequencies, by using only code words corresponding to CDS ±1, the pilot signals of the DSV cycle arc synchronized with digital data in the low frequency range where the power spectrum of the digital data is rapidly damped, to obtain a drop in the data error rate due to the pilot signals in the reproduced signal.

Figure 27:
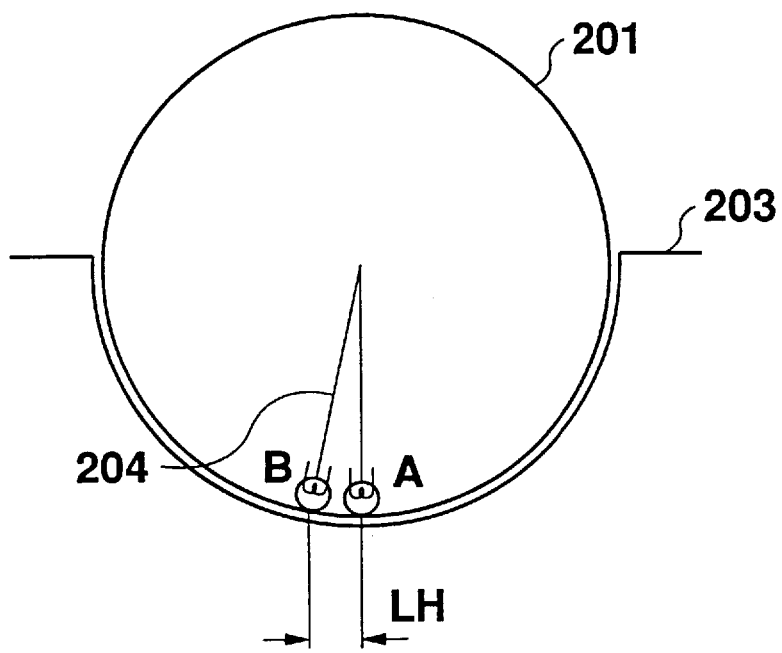
FIG. 27 shows one embodiment of a rotary magnetic head device according to the present invention.

In FIG. 27, there is shown one embodiment of a rotary magnetic head device for use in a magnetic recording and reproducing apparatus according to the present invention. Of course, this rotary magnetic head device is suitable for use in the systems shown in FIGS. 14 and 24.

As shown in FIG. 27, the double azimuth head 204 is composed of two heads A and B having different azimuth angles, which are arranged on the periphery of a rotary drum 201 at distance LH apart, LH being an integer number of times as long as a distance corresponding to approximately one cycle of a pilot signal. A recording medium 203 such as a magnetic tape is wound around approximately half the rotary drum 201.

Before describing the operation of the rotary magnetic head device according to the present invention, to aid understanding of the effectiveness of the rotary magnetic head device of the present invention, a high density magnetic recording and reproducing system achieved by using the rotary magnetic head device according to the present invention will be described.

In order to realize the high density magnetic recording, not only must the wavelength be shortened but also the tracking pitch is made narrower. For instance, it is presumed that in allocation of a high area density recording coming up to 1 $\mu m^2$/bit, narrow tracks such as a line density of 100 KBPI and a recording track width (pitch) of 4 $\mu m$ are accomplished.

In order to achieve such a narrow track recording, a DTF (dynamic track following) control for making a reproduction head trace or track on a curved track is required in the reproducing, and it is also necessary to record a pilot signal for forming an error signal for the DTC control on the recording track. Further, in the recording of the pilot signal, the wavelength (frequency) should be determined so that the visual or audio data are sufficiently low compared with the recording range and no amplitude drop accompanied with the azimuth effect of the azimuth head is caused.

Further, in the digital recording, since extremely low frequency components in exist the spectrum to be recorded onto the recording medium after the digital modulation, when the pilot signals are added to the digital-modulated data and the added data are recorded onto the recording medium, on demodulating the digital-modulated data to the original signal, the pilot signals cause disturbance and code errors increase during reproduction. In order to avoid this problem, a method for recording pilot signals synchronized with the digital data by controlling the DSV in the digital modulation on the recording is disclosed in Japanese patent laid-open No.Hei 1-317280. In this case, the pilot signal of the track being scanned causes no disturbance, but the crosstalk of the pilot signals from the adjacent tracks become disturbance signals and cause code errors in the demodulation.

Figure 28:
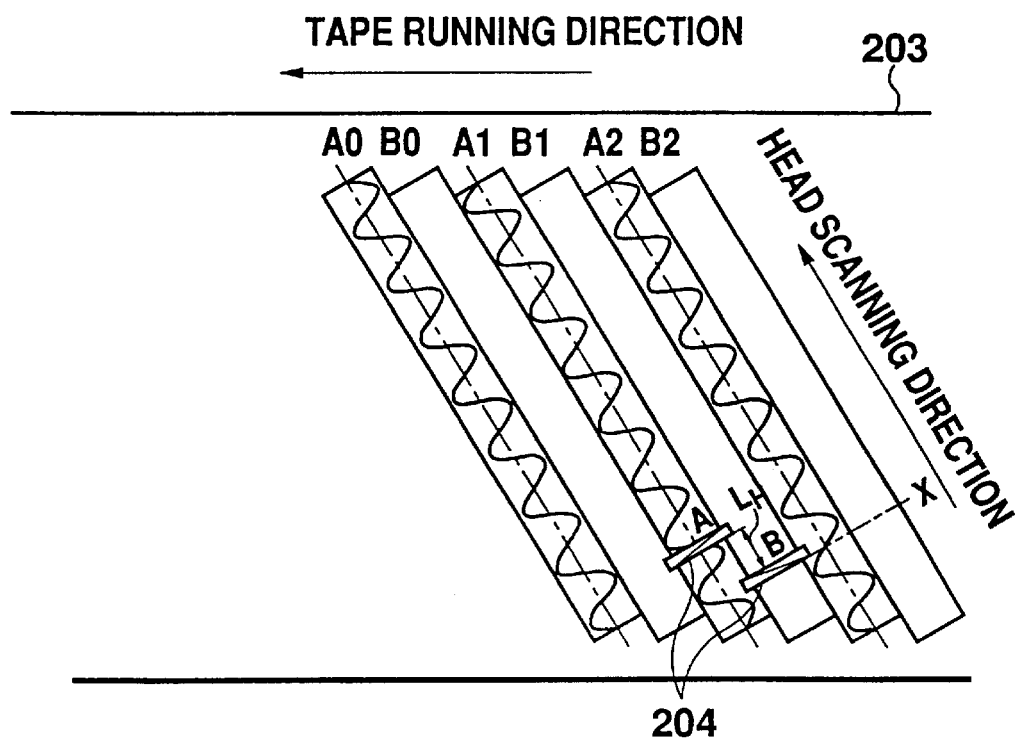
FIG. 28 shows a relationship between a recording track pattern recorded on a recording medium and the rotary magnetic head device shown in FIG. 27.

Hence, according to the present invention, as shown in FIG. 28, the pilot signals are recorded every other track in a different format so that the phases of the pilot signals may be inverted through 180° every recording of the pilot signal on the track, and hence the crosstalk of the pilot signals from the two tracks adjacent to the track being scanned is mutually cancelled out to zero when the head is on track. Therefore, when the digital-modulated data are demodulated, an excellent demodulation can be performed without, sustaining the influence of any of the pilot signals. The present invention can be appropriately applied to the above-descried magnetic recording and reproducing apparatus.

The operation of the rotary magnetic head device according to the present invention will now be described in detail in connection with FIGS. 27 to 30.

In FIG. 28, tracks A0, A1 and A2 are recorded by-head A of the double azimuth head 204, and on the tracks A0, A1 and A2, the digital-modulated data along with the pilot signals having the frequency f(PILOT) are recorded in multiple by controlling the DSV. Also, tracks B0, B1 and B2 are recorded by the head B of the double azimuth head 204, and on the tracks B0, B1 and B2, no pilot signal is recorded, that is, only the digital-modulated data are recorded. In this instance, as is apparent from the waveforms of the pilot signals recorded on the tracks A1 and A2 at the points indicated by a line X shown in FIG. 28, the phases of each pilot signal is shifted 180° from the two pilot signals either side of it.

Figure 29:
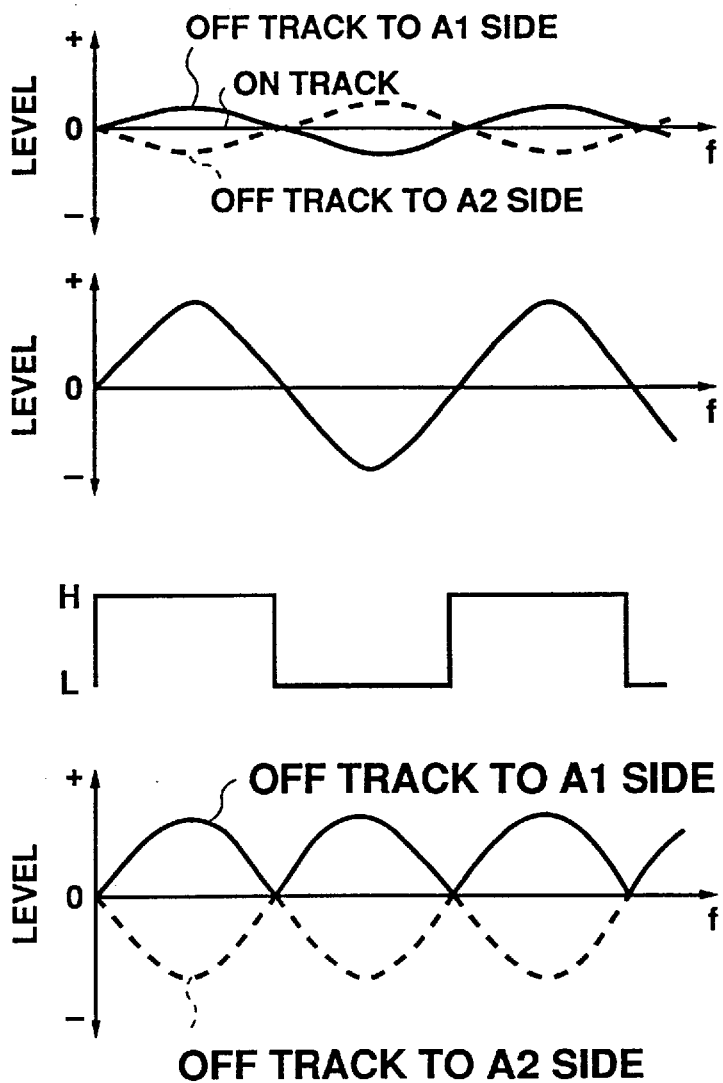
FIG. 29 shows wave forms of pilot signals picked up by the rotary magnetic head device according to the present invention.

By recording such pilot signals, as shown in FIG. 29, relating to the pilot signals picked up by the head B of the double azimuth head 204 from the tracks A1 and A2 adjacent to the head B1 being scanned by the head B, when the head B is on-track in the center of the track B1, the crosstalk amounts of the tracks A1 and A2 having 180° different phases are equal but opposite and thus become zero. On the other hand, when the head B is off-track in the direction of the track A1 or A2, the pilot signal recorded on the track A1 or A2 will be output.

Since the track shift is detected as described above, when the head is on-track, the crosstalk becomes zero, and the pilot signals cause no disturbance in demodulating the digital-modulated data. However, in the on-track condition, no information can be directly obtained from the pilot signals detecting the track shifts, and no error signal for driving the servo can be formed. Accordingly, for obtaining the information for detecting the track shift, the pilot signals picked up by the head A can be used.

In FIG. 28, since the phases of the pilot signals of the tracks A1 and A2 are inverted through 180°, at the points indicated by the line X, the head B picks up the pilot signals whose levels change from (+) to (−) or from (−) to (+) in the track A1 or A2, and one pilot signal which the head B is off track towards more than the other is used. On the other hand, the head A scans the track A1. In the double azimuth head 204, when the head A is positioned preceding the distance LH corresponding to integral number times as much as approximately the wavelength of the pilot signal (f(PILOT) /Vh) (Vh: relative speed of the head with respect to the recording medium) from the head B, as shown in FIG. 29, the signal picked up by the head A has the same phase as that of the pilot signal picked up by the head B shifting in the A1 direction. As a result, an error signal for driving the servo can be formed by a simple method as follows.

Figure 30:
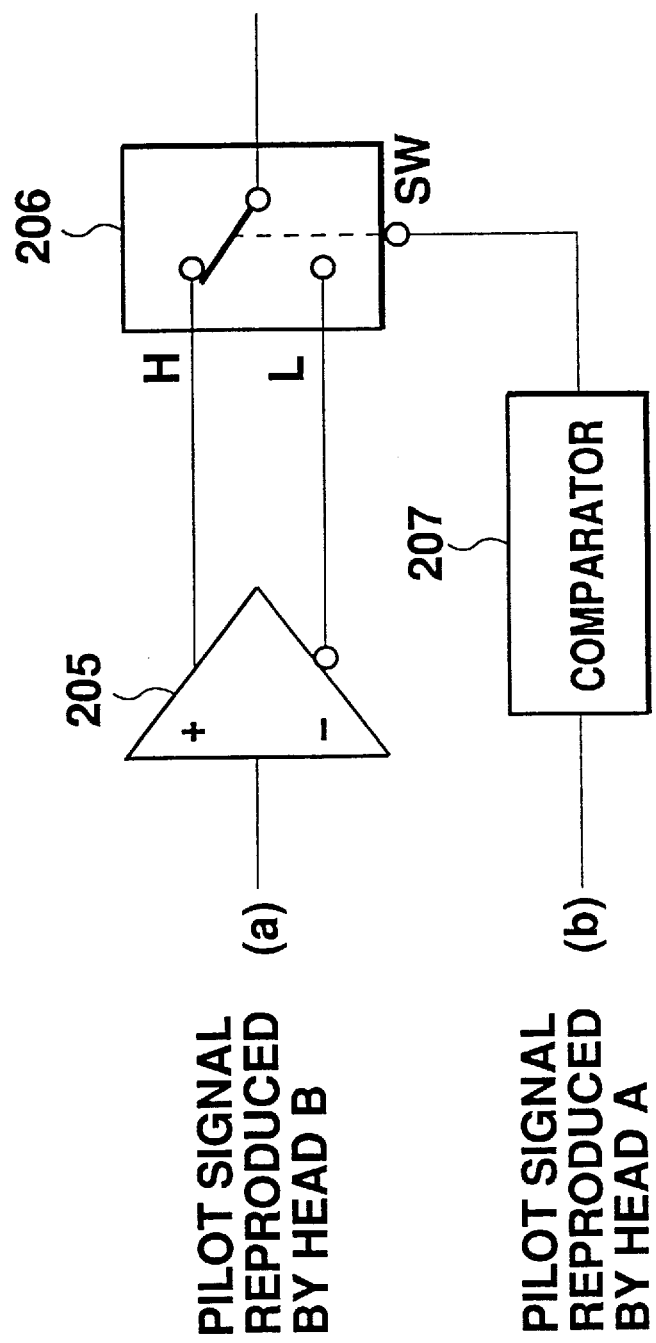
FIG. 30 is a synchronous detection circuit of the pilot signals shown in FIG. 29.

In FIG. 30, there is shown a synchronous detector circuit for the pilot signals. The pilot signal picked up by the head B is input to an input (a) leading to a differential amplifier 205 for outputting a normal signal to an H input of an analog switch 206 and an inverted signal to an L input of the same. Then, the pilot signal picked up by the head A is input to an input (b) connected to a comparator 207, and the pilot signal is converted into a High or Low digital signal in the comparator to output the signal to be used as a switching signal to an SW terminal of the analog switch 206. flence, the analog switch 206 outputs, as shown in FIG. 29, a (+) level synchronous detection output when the head B is shifted in the A1 direction, or a (−) level synchronous detection output when the head B is shifted in the A2 direction. As a result, the track shift direction and amount in the synchronous detection outputs, are extracted, and thus this signal can be used as a tracking error signal to carry out the tracking servo control or the DTF control.

Further when the distance LH between the heads A and B is out of the above-described condition, a PLL clock is formed by the output signal of the comparator 207, and the phase of the clock signal is controlled to be the same as or reverse to that of the pilot signal picked up by the head B to invite an increase of a scale of the circuit.

Although the interval LH between the two heads A and B is set to an integral number of times as much as approximately the wavelength of the pilot signal f(PILOT)/Vh, even when the polarities (+) and (−) of the synchronous detection with reference to the track shift are reversed, there is no problem in the formulas, and it is sufficient to set the head interval LH to the distance approximately corresponding to the integral number of times as much as 2f(PILOT)/Vh.

As described above, according to the present invention, since the distance between the heads A and B of the double azimuth head 204 is determined to a distance approximately corresponding to an integral number of times as much as f(PILOT)/Vh, when the pilot error signal is synchronously detected, the signal processing can be carried out only on the picked up signals, and the rotary magnetic head device can be fabricated at low cost with high accuracy.

When a pilot error signal is formed, a pilot signal picked up by one head is used as the signal for carrying out synchronous detection, and a pilot signal picked up by another head is directly used.

Although the present invention has been described in its preferred embodiments with reference to the accompanying drawings, it it readily understood that the present invention is not restricted to the preferred embodiments and that various changes and modifications can be made by those skilled in the art without departing from the spirit and scope of the present invention.

What is claimed is:

1. A pilot signal formation method for obtaining a tracking error signal in a magnetic recording and reproducing apparatus in which digital signals are recorded or reproduced onto or from a magnetic medium by using a rotary magnetic head device mounted on a rotary drum, comprising:

allowing a pair of groups of n bits of code words corresponding to CDSs (code word digital sum) of two codes +1 and −1 to correspond to m bits of digital in a data conversion from the m bits of two-value digital signals into the n bits of code words, n being larger than m, in a recording; and controlling a DSV (digital sum variation) of a string of digital data by using selected one of the two codes +1 and −1 according to a DSV control signal, an initial phase of the DSV control signal being preset by a signal synchronized with a drum PG signal for controlling the phase of the drum to form a pilot signal synchronized with the digital data.

2. The method of claim 1, wherein m is 12 and n is 15.

3. A pilot signal formation method for obtaining a tracking error signal in a magnetic recording and reproducing apparatus in which digital signals are recorded or reproduced onto or from a magnetic medium by using a rotary magnetic head device mounted on a rotary drum, comprising:

allowing a pair of groups of n bits of code words corresponding to CDSs (code word digital sum) of two codes +1 and −1 to correspond to m bits of digital signals in a data conversion from the m bits of two-value digital signals into the n bits of code words, n being larger than m, in a recording;

selecting two kinds of DSV (digital sum variation) control signals formed by counting a code conversion cycle, by a drum PG signal for controlling the phase of the drum;

setting the DSV at an end of the code word to 0 every predetermined cycle by using selected one of the two codes +1 and −1 according to the selected DSV control signals to form two kinds of pilot signals so that the frequency of the pilot signal is alternately changed every recording trace.

4. The method of claim 3, wherein m is 12 and n is 15.

5. A method of encoding data for storage on a magnetic storage medium comprising:

providing data arranged in data words of m bits;

developing plural code words of n bits from each said data word of m bits, each of said plural code words for a said data word having a different known CDS (code word digital sum);

providing a DSV (digital sum variation) control signal representative of a desired variation in DSV which can be accomplished by selection of a code word having a selected CDS; and selecting one of said plural code words having the known CDS required to produce the desired variation in DSV represented by said DSV control signal to make the DSV of said code word string correspond to desired variation in DSV.

6. The method of claim 5 wherein said plural code words associated with each data word include code words having CDSs which are of opposite polarity.

7. The method of claim 5 wherein said desired variation in DSV is periodic and said step of selecting selects the one of said plural code words having a CDS which produces said periodic variation in DSV.

8. The method of claim 7 wherein said periodic variation in the DSV produces a pilot signal superimposed on the encoded data to enable tracking of said encoded data when linearly recorded on an information track.

9. The method of claim 7 further comprising recording said selected ones of said plural code words on said magnetic storage medium using at least one magnetic head;

said step of providing a DSV control signal centering said periodic variation in DSV around 0 so that substantially no D.C. voltage will be supplied to said magnetic head.

10. The method of claim 8 further comprising recording said selected ones of said plural code words on said magnetic storage medium using at least one magnetic head;

said step of providing a DSV control signal centering said periodic variation in DSV around 0 so that substantially no D.C. voltage will be supplied to said magnetic head.

11. The method of claim 10 wherein the encoded information is recorded on parallel information tracks, the pilot signals of adjacent tracks differing in frequency or phase.

12. The method of claim 5 further comprising NRZI modulating said selected code word to produce a signal for recordation.

13. The method of claim 7 wherein said DSV control signal alternates every k words, where k is an integer.

14. The method of claim 13 wherein k=1.

15. The method of claim 13 wherein k=5.

16. A method of encoding data for storage on a magnetic storage medium comprising:

providing data arranged in data words of m bits;

developing plural code words of n bits from each said data word of m bits, each of said plural code words for a said data word having a different known CDS (code word digital sum);

producing a digital data signal by sequentially selecting one of said plural code word associated with each of said data words, said step of producing including, embedding a pilot signal in the digital data signal by selecting a said plural code word associated with each of said data words which has a CDS which will produce a desired variation in DSV, thereby forming the pilot signal.

17. The method of claim 16 wherein said step of embedding includes the step of, defining a desired pilot signal by producing a DSV control signal representative of the desired variation in DSV; said step of producing selecting the said control word having the CDS necessary to produce the desired variation in DSV under control of said DSV control signal.

18. The method of claim 16 wherein said plural code words associated with each data word include code words having CDSs which are of opposite polarity.

19. The method of claim 16 wherein said desired variation in DSV is periodic to form said pilot signal and said step of producing selects the one of said plural code words having a CDS which produces said periodic variation in DSV.

20. A system for encoding data for storage on a magnetic storage medium comprising:

a converter developing plural code words of n bits from each data word of m bits, each of said plural code words associated with a said data word having a different known CDS (code word digital sum;

means for receiving a DSV (digital sum variation) control signal representative of a desired variation in DSV which can be accomplished by selection of a code word having a selected CDS; and a DSV controller selecting one of said plural code words having the known CDS required to produce the desired variation in DSV represented by the DSV control signal to make the DSV of said code word string correspond to the desired DSV.

21. The system of claim 20 wherein said plural code words associated with each data word include code words having CDSs which are of opposite polarity.

22. The system of claim 21 wherein said desired variation in DSV is periodic and said DSV controller selects the one of said plural code words having a CDS which produces said periodic variation in DSV.

23. The system of claim 22 wherein said periodic variation in the DSV produces a pilot signal superimposed on the encoded data to enable tracking of said encoded data when linearly recorded on an information track.

24. The system of claim 22 further comprising means for recording said selected ones of said plural code words on said magnetic storage medium using at least one magnetic head;

said DSV controller centering said periodic variation in DSV around 0 so that substantially no D.C. voltage will be supplied to said magnetic head.

25. The system of claim 23 further comprising means for recording said selected ones of said plural code words on said magnetic storage medium using at least one magnetic head;

said DSV controller centering said periodic variation in DSV around 0 so that substantially no D.C. voltage will be supplied to said magnetic head.

26. The system of claim 25 wherein said means for recording records said encoded information on parallel information tracks, the pilot signals of adjacent tracks differing in frequency or phase.

27. The system of claim 20 further comprising NRZI modulation means for NRZI modulating said selected code word to produce a signal for recordation.

28. The system of claim 22 wherein said DSV control signal alternates every k words, where k is an integer.

* * * * *